United States Patent [19]

Kuno et al.

[11] 4,328,776

[45] May 11, 1982

[54] SPEED CONTROL SYSTEM FOR AUTOMOTIVE VEHICLES

[75] Inventors: Akira Kuno, Oobu; Takeshi Matsui; Yoshio Shinoda, both of Aichi, all of Japan

[73] Assignee: Nippon Soken, Inc., Nishio, Japan

[21] Appl. No.: 166,699

[22] Filed: Jul. 3, 1980

[30] Foreign Application Priority Data

Jul. 9, 1979 [JP]  Japan .................................. 54-87271

[51] Int. Cl.$^3$ ...................... B60K 31/00; F02D 11/10
[52] U.S. Cl. .................................... 123/352; 180/179; 364/431.07
[58] Field of Search ........................ 123/350, 352–355; 180/176, 179; 364/431

[56] References Cited

U.S. PATENT DOCUMENTS

| | | | |
|---|---|---|---|
| 3,820,624 | 6/1974 | Sakakibara ...................... | 123/352 X |
| 3,869,019 | 3/1975 | Cardani .......................... | 123/352 X |
| 3,885,137 | 5/1975 | Ooya et al. ...................... | 180/176 X |
| 4,224,907 | 9/1980 | Lefeuvre et al. .................. | 123/352 |
| 4,250,854 | 2/1981 | Matsui et al. ..................... | 123/352 |

*Primary Examiner*—Tony M. Argenbright
*Attorney, Agent, or Firm*—Cushman, Darby & Cushman

[57]     ABSTRACT

A vehicle speed control system includes a first generator for producing an operation signal upon closure of a set switch at a desired vehicle speed and receipt of a timing signal from a second generator responsive to the actual vehicle speed, the operation signal disappearing in response to one of the subsequent timing signals. A first calculator calculates a first time difference between predetermined and instant time periods respectively defined by the desired and actual vehicle speeds, and a second calculator calculates a second time difference between the respective instant time periods. A third generator produces a correction signal defined by the second time difference during generation of the operation signal and produces another correction signal defined by the sum or a difference of the time differences in relation to identical or opposite signs of the time differences after disappearance of the operation signal. A distribution circuit is responsive to one of the correction signals to produce an output signal relative to the sign of the second time difference such that an actuator controls an engine throttle opening angle.

4 Claims, 10 Drawing Figures

SPEED CONTROL SYSTEM FOR AUTOMOTIVE VEHICLES

BACKGROUND OF THE INVENTION

The present invention relates to a speed control system for automotive vehicles, and more particularly to an improvement of a speed control system for an automotive vehicle of the type in which the opening angle of the engine throttle is controlled in accordance with the actual speed of the vehicle and the rate of change of the actual speed in relation to a desired command speed.

In such a conventional speed control system as described above, a set switch is closed to produce a set signal when the actual speed of the vehicle reaches a desired value. In response to the set signal, the desired value of the vehicle speed is calculated and memorized, and subsequently a value of the actual speed is repetitively calculated in relation to the memorized value to detect a difference between the desired command speed and the actual speed of the vehicle. Thus, the opening angle of the engine throttle is controlled in accordance with the detected speed difference. This means that the control of the engine throttle may not be conducted at the initial stage to cause undesired change of the actual speed immediately after closing the set switch.

SUMMARY OF THE INVENTION

It is, therefore, a primary object of the present invention to provide an improved speed control system in which the opening angle of the engine throttle is temporarily controlled in accordance with the actual acceleration of the vehicle prior to completion of the initial calculation to smoothly conduct the transitional control of the vehicle speed toward the desired value.

In accordance with the present invention, there is provided a speed control system for an automotive vehicle driven by an internal combustion engine under control of a throttle valve, the control system comprising:

first means for repetitively producing a timing signal with a period of time responsive to change of the actual speed of the vehicle;

second means arranged to be activated when the actual speed of the vehicle reaches a desired value, the second means producing a set signal upon activation thereof;

third means responsive to the set signal for producing an operation signal upon receiving the timing signal and for ceasing generation of the operation signal in response to one of the subsequent timing signals from the first means;

fourth means for producing a command signal indicative of a predetermined period of time defined by the desired speed of the vehicle;

fifth means responsive to the timing signal for calculating a first time difference between the predetermined period of time and the actual period of time of the timing signal and for producing a first differential signal indicative of a first absolute value of the calculated first time difference and a first sign signal indicative of the positive or negative sign of the calculated first time difference;

sixth means responsive to the timing signal for calculating a second time difference between the respective actual periods of time of the preceding and following timing signals and for producing a second differential signal indicative of a second absolute value of the calculated second time difference and a second sign signal indicative of the positive or negative sign of the calculated second time difference;

seventh means responsive to the timing and second differential signals during generation of the operation signal for producing a first correction signal indicative of the second absolute value, the seventh means being responsive to the timing signal and the first and second differential signals after disappearance of the operation signal for calculating the sum of the first and second absolute values when respective signs of the first and second sign signals are identical to each other and for calculating a difference between the first and second absolute values when respective signs of the first and second sign signals are opposite to each other, the seventh means selectively producing second and third corretion signals respectively indicative of the calculated sum and the calculated difference;

eighth means responsive to one of the first, second and third correction signals for selectively producing first and second output signals in relation to the positive or negative sign of the second sign signal; and actuator means for increasing and decreasing the opening angle of the throttle valve respectively in response to the first and second output signals.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
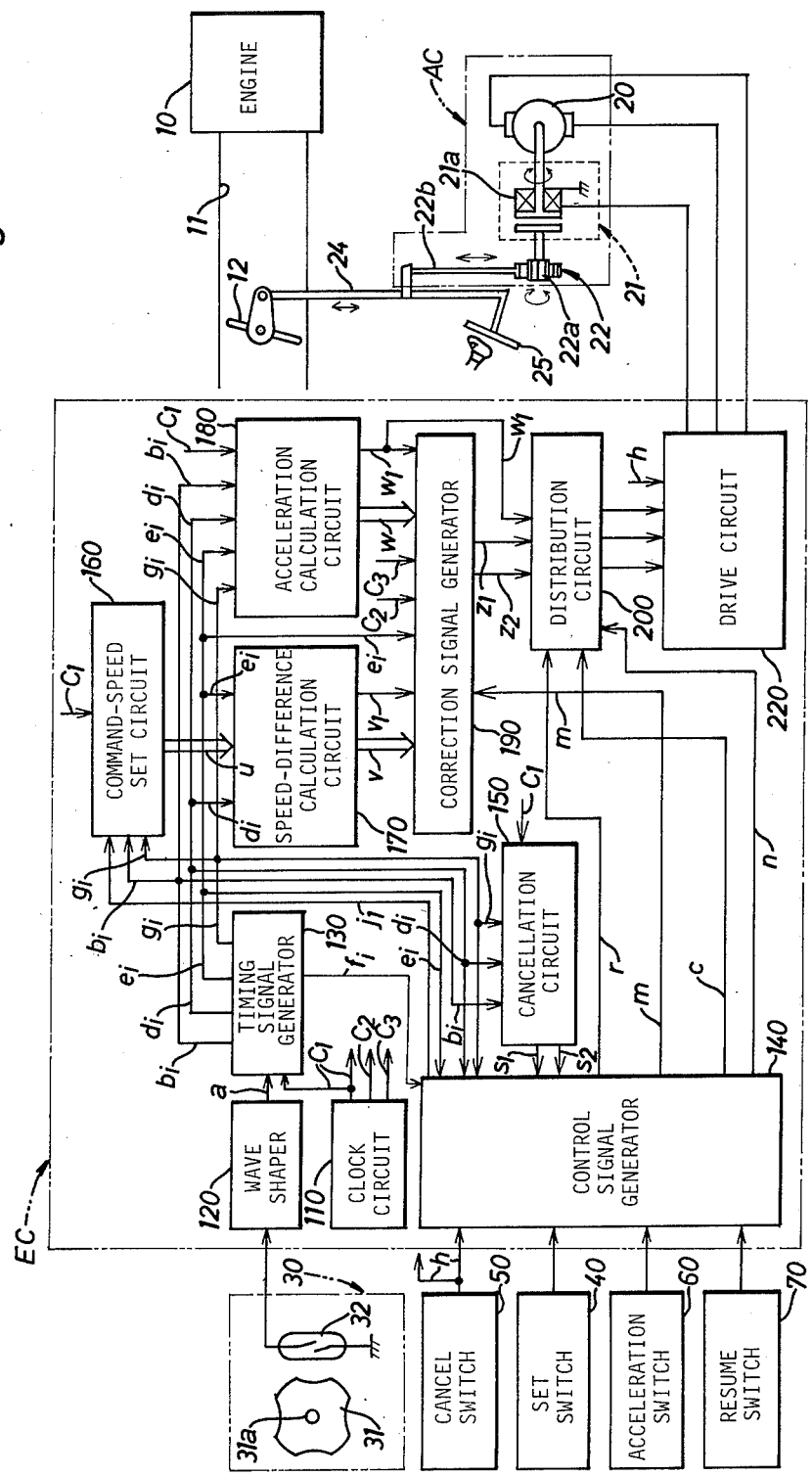
FIG. 1 is a schematic block diagram of a speed control system in accordance with the present invention which is adapted to an automotive vehicle.

Referring now to the drawings, in particular to FIG. 1 there is illustrated a speed control system in accordance with the present invention which is adapted to an internal combustion engine 10 of an automotive vehicle. The speed control system comprises a throttle actuator AC which is operatively coupled with a throttle valve 12 provided within an induction passage 11 of engine 10. The throttle valve 12 is linked with an accelerator pedal 25 by a rod 24 which extends into the induction passage 11. The throttle actuator AC comprises an electric reversible motor 20 which is coupled with a rack-and-pinion 22 by an electromagnetic clutch mechanism 21. The clutch mechanism 21 is provided with a rotor connected to an output shaft of reversible motor 20 and with a clutch disc splined on a pinion 22a of rack-and-pinion 22. A rack 22b of rack-and-pinion 22 is linked with the throttle valve 12 by the rod 24.

The clutch mechanism 21 is also provided with an electromagnetic coil 21a for receiving a first drive signal from an electronic control circuit EC, as described below. When the electromagnetic coil 21a is energized in response to the first drive signal from control circuit EC, the clutch mechanism 21 engages the clutch disc with the rotor to connect the pinion 22a to the output shaft of reversible motor 20. When the coil 21a is deenergized due to disappearance of the first drive signal from control circuit EC, the clutch disc is disengaged from the rotor to disconnect the pinion 22a from the output shaft of reversible motor 20. The reversible motor 20 has a pair of input terminals for respectively receiving second and third drive signals from the control circuit EC, as described below. When the reversible motor 20 rotates clockwise in response to the second drive signal from control circuit EC under engagement of clutch mechanism 21, the rack-and-pinion 22 moves the rod 24 downward to increase an opening angle of throttle valve 12. When the motor 20 rotates counterclockwise in response to the third drive signal from control circuit EC, the rack-and-pinion 22 moves the rod 24 upward to decrease the throttle opening angle.

Figure 4:
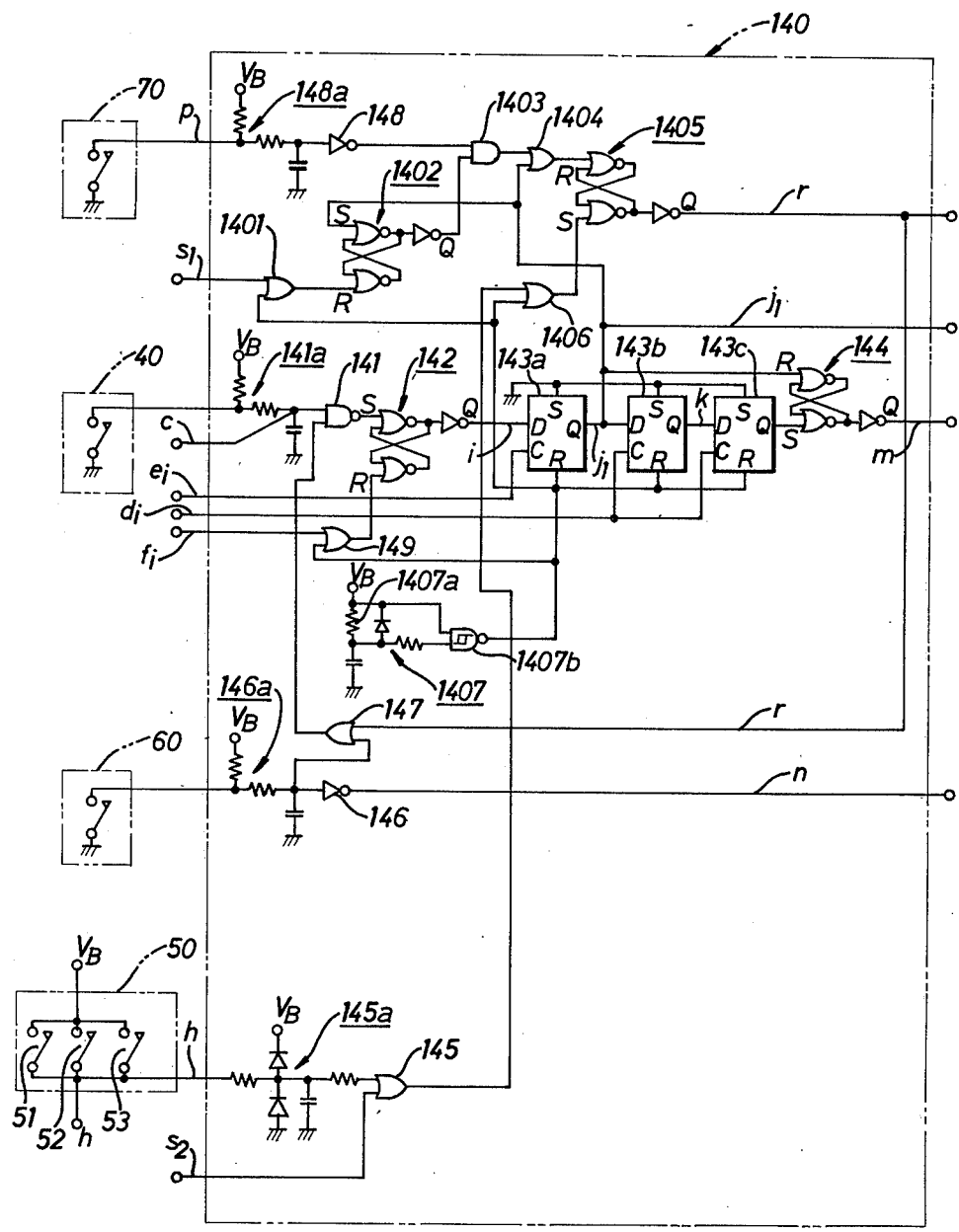
FIG. 4 is a circuit diagram of an embodiment of the control signal generator shown in block form of FIG. 1 in relation to the various switches.

The speed control system also comprises a speed sensor 30 and various switches 40, 50, 60 and 70, each of which is connected to the electronic control circuit EC. The speed sensor 30 includes a reed switch 32 which is located in magnetic coupling relationship with a disc 31 of permanent magnet. The disc 31 is drivingly coupled with a flexible cable 31a of a speedometer for the automotive vehicle. The reed switch 32 is repetitively opened and closed due to rotation of the disc 31 to produce a series of electric signals respectively having a frequency proportional to the actual speed of the vehicle. In the embodiment, the frequency of the electric signal from sensor 30 is, for instance, 42.5 Hz at a vehicle speed of 60 km/h. The set switch 40 is of a normally open type, as shown in FIG. 4 and is temporarily closed at a desired or command speed of the vehicle to produce an electric signal. The electric signal from set switch 40 is used to form a set signal necessary for setting the desired speed in the control circuit EC.

The cancel switch 50 is provided with brake, clutch and parking switches 51, 52 and 53 which are respectively in the form of a normally open type and connected in parallel to each other (see FIG. 4). The brake switch 51 is provided on a foot brake pedal of the vehicle to be closed upon depression of the brake pedal, and the clutch switch 52 is provided on a clutch pedal of the vehicle to be closed upon actuation of the clutch pedal. The parking switch 53 is also provided on a parking mechanism of the vehicle to be closed upon manipulation of the parking mechanism. When one of the switches 51, 52 and 53 is closed, the cancel switch 50 produces a release signal h (see FIG. 5) for making the control circuit EC inoperative. The acceleration switch 60 is of a normally open type and manually closed to produce an electric signal. The electric signal from acceleration switch 60 is used as one necessary for accelerating the vehicle under control of the control circuit EC. The resume switch 70 is also in the form of a normally open type and manually closed to produce a resume signal p (see FIG. 5). The resume signal p is used as one necessary for resuming operativeness of the control circuit EC.

Figure 3:
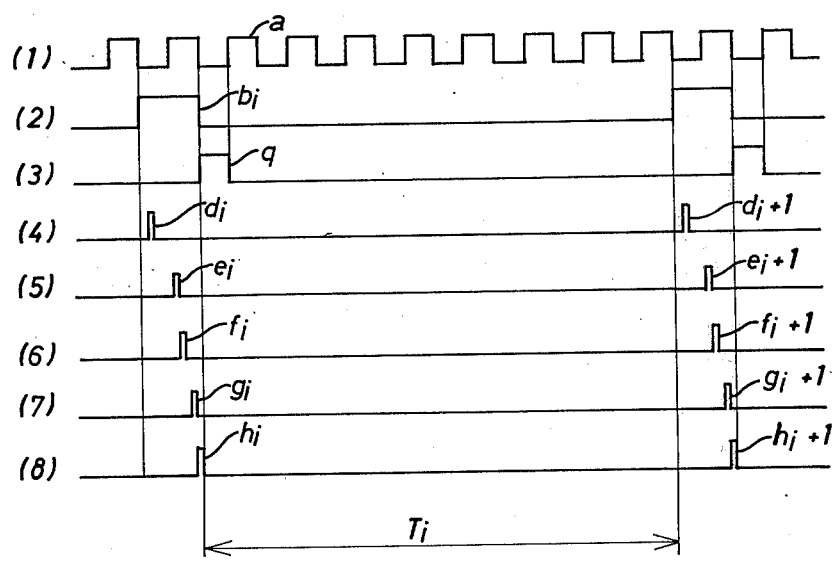
FIG. 3 illustrates waveforms obtained at various points in the wave shaper and timing signal generator.

The electronic control circuit EC includes a clock circuit 110, and a timing signal generator 130 connected through a wave shaper 120 to the speed sensor 30, as shown in FIG. 1. The clock circuit 110 serves to produce each series of first, second and third clock signals $C_1$, $C_2$ and $C_3$. Each of the electric signals from speed sensor 30 is reshaped by the wave shaper 120 into a rectangular pulse signal a in sequence (see FIG. 3). The timing signal generator 130 produces a gate signal $b_i$, latch and preset signals $d_i$ and $e_i$ and reset signals $f_i$ and $g_i$ ($i = 1, 2, 3, \ldots$) in accordance with each series of the first clock and pulse signals $C_1$ and a respectively from clock circuit 110 and wave shaper 120, the gate signal $b_i$ having a period of time $T_i$ (see FIG. 3).

The control circuit EC also includes a control signal generator 140 which is connected to the switches 40 to 70, the timing signal generator 130 and a cancellation circuit 150. Upon receiving the reset signal $g_i$ from timing signal generator 130, the cancellation circuit 150 produces release signals $s_1$ and $s_2$ in accordance with a series of the first clock signals $C_1$ corresponding to the period of time $T_i$ of gate signal $b_i$ from timing signal generator 130. When the cancellation circuit 150 receives the latch signal $d_i$ from timing signal generator 130, the release signal $s_2$ is also produced in accordance with a series of the first clock signals $C_1$ corresponding to the period of time $T_i$ of gate signal $b_i$. The release signals $s_1$ and $s_2$ from cancellation circuit 150 are respectively applied to the control signal generator 140.

Figure 5:
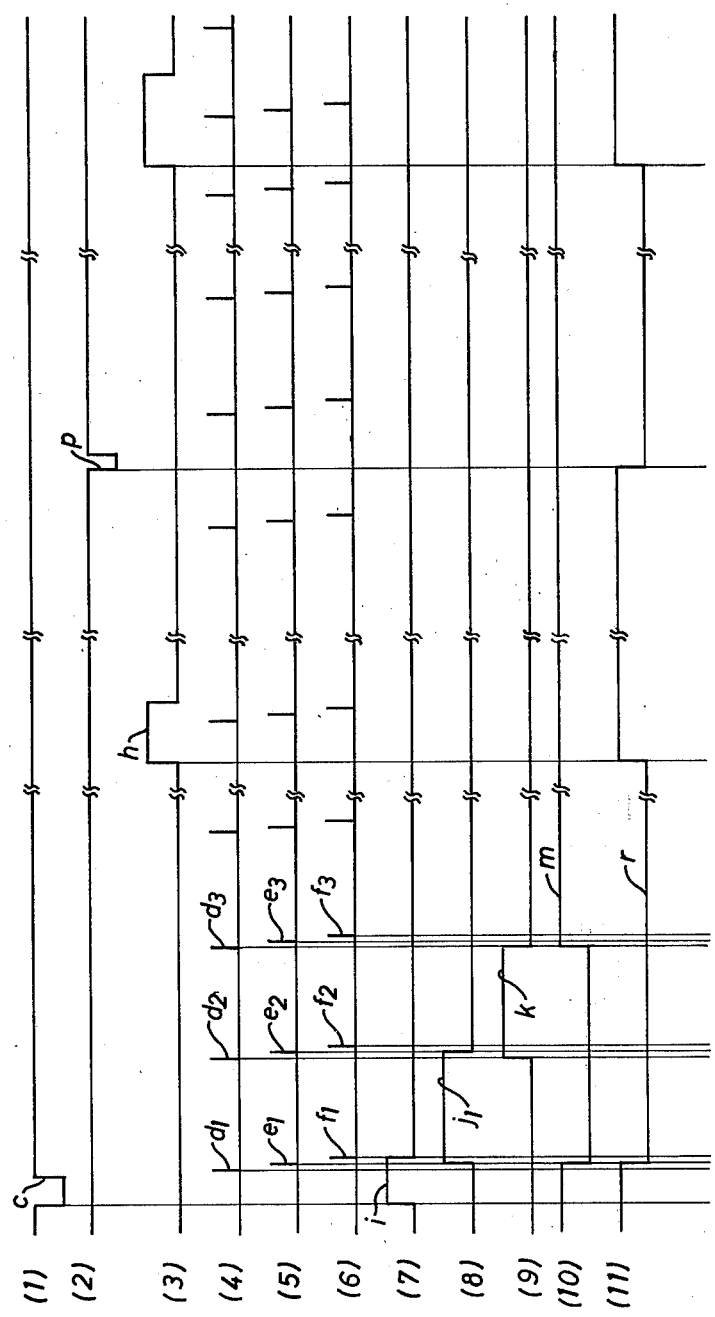
FIG. 5 illustrates waveforms obtained at various points in the control signal generator and various switches.

The control signal generator 140 receives the electric signal from set switch 40 to form a set signal c (see FIG. 5). The set signal c is applied to a distribution circuit 200. The control signal generator 140 receives the electric signal from set switch 40 and the latch, preset and reset signals $d_i$, $e_i$ and $f_i$ from timing signal generator 130 to produce a command-speed set signal $j_1$ and operation signals m and r (see FIG. 5). The operation signal r is also produced from the control signal generator 140 in response to the resume signal p from resume switch 70 but is reset in response to the release signal h from cancel switch 50 or the release signals $s_1$ and $s_2$ from cancellation circuit 150. The command-speed set signal $j_1$ is applied to a command-speed set circuit 160, and the operation signals m and r are respectively applied to a correction signal generator 190 and the distribution circuit 200. Upon receiving the electric signal from acceleration switch 60, the control signal generator 140 produces an acceleration signal n. The acceleration signal n is applied to the distribution circuit 200.

Upon receiving the reset signal $g_i$ from timing signal generator 130 and the command-speed set signal $j_1$ from control signal generator 140, the command-speed set circuit 160 memorizes therein a binary signal u which indicates a total period of time of a series of the first clock signals $C_1$ defined by the period of time $T_i$ of gate signal $b_i$ from timing signal generator 130. The binary signal u has a value corresponding to the command-speed of the vehicle and is applied to a speed-difference calculation circuit 170. Upon receiving the preset signal $e_i$ from timing signal generator 130, the speed-difference calculation circuit 170 calculates a first time difference between the value of binary signal u and a total period of time of a series of the first clock signal $C_1$ defined by the period of time $T_i$ of gate signal $b_i$. Upon completion of the calculation, the calculation circuit 170 produces a binary signal v indicative of an absolute value of the calculated first time difference and also produces a sign signal $v_1$ indicative of a positive or negative sign of the calculated first time difference. In the embodiment, the calculated first time difference is used as a value corresponding to a speed difference between the actual and command speeds of the vehicle. The binary and sign signals v and $v_1$ are latched and applied by the calculation circuit 170 to the correction signal generator 190 in response to the latch signal $d_i$ from timing signal generator 130.

Upon receiving the reset and preset signals $g_i$ and $e_i$ from timing signal generator 130, the acceleration calcultion circuit 180 calculates a second time difference between a total period of time of a series of the first clock signals $C_1$ defined by the period of time $T_i$ of gate signal $b_i$ and another total period of time of a series of the first clock signals $C_1$ defined by a period of time $T_{i+1}$ of a gate signal $b_{i+1}$ following the above gate signal $b_i$. Upon completion of the calculation, the calculation circuit 180 produces a binary signal w indicative of an absolute value of the calculated second time difference and also produces a sign signal $w_1$ indicative of a positive or negative sign of the calculated second time difference. In the embodiment, the calculated second time difference is used as a value corresponding to actual acceleration of the vehicle. The binary signal w is latched and applied by the calculation circuit 180 to the correction signal generator 190 in response to the latch signal $d_i$ from timing signal generator 130, and simultaneously the sign signal $w_1$ is latched and applied by the calculation circuit 180 to the correction signal generator 190 and distribution circuit 200.

Upon receiving the preset signal $e_i$ from timing signal generator 130, the correction signal generator 190 produces a first correction signal $z_1$ which is defined by the binary signal w from calculation circuit 180 and the sign signals $v_1$ and $w_1$ from calculation circuits 170 and 180 in accordance with a series of the third clock signals $C_3$. Upon receiving the preset signal $e_i$ from timing signal generator 130, the correction signal generator 190 also produces a second correction signal $z_2$ which is defined by the operation signal m from control signal generator 140 and the binary and sign signals v, w and $v_1$, $w_1$ from calculation circuits 170 and 180 in accordance with each series of the second and third clock signals $C_2$ and $C_3$. The first and second correction signals $z_1$ and $z_2$ from correction signal generator 190 are respectively applied to the distribution circuit 200.

After disappearance of the set signal c from control signal generator 140, the distribution circuit 200 acts to produce a first distribution signal in response to the operation signal r form control signal generator 140. The distribution circuit 200 also produces a second distribution signal in response to the acceleration and operation signals n and r from control signal generator 140. Furthermore, the distribution circuit 200 selectively produces the second distribution signal and a third distribution signal in response to the operation signal r, the sign signal $w_1$ from calculation circuit 180 and the correction signals $z_1$ and $z_2$ from correction signal generator 190. The first to third distribution signals from distribution circuit 200 are respectively applied to a drive circuit 220. While the release signal h from cancel switch 50 disappears, the drive circuit 220 acts to produce the above-noted first to third drive signals respectively in response to the first to third distribution signals from distribution circuit 200. Each of the first to third drive signals from drive circuit 220 disappears in response to the release signal h from cancel switch 50.

Figure 2:
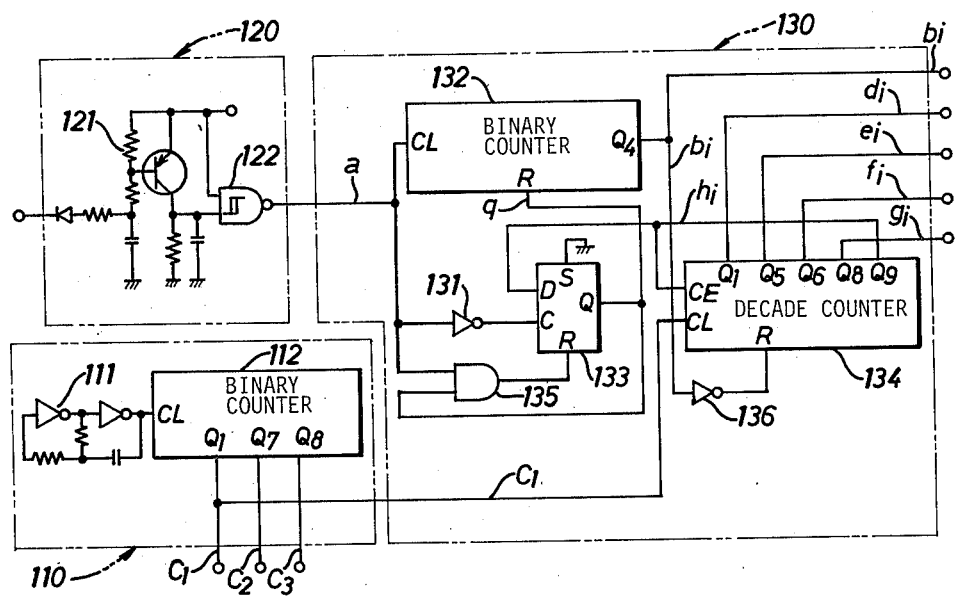
FIG. 2 is circuit diagrams of embodiments of the wave shaper, clock circuit and timing signal generator respectively shown in block form in FIG. 1.

In FIG. 2, there are illustrated preferred embodiments respectively of the clock circuit 110, the wave shaper 120 and the timing signal generator 130. The clock circuit 110 includes a binary counter 112 for receiving a series of pulse signals from an oscillator 111. The binary counter 112 serves to count the pulse signals from oscillator 111 in such a manner as to produce each series of the first, second and third clock signals $C_1$, $C_2$ and $C_3$ respectively at its output terminals $Q_1$, $Q_7$ and $Q_8$. In the embodiment, frequencies of the first, second and third clock signals $C_1$, $C_2$ and $C_3$ are determined as 8 KHz, 125 Hz and 62.5 Hz respectively. The wave shaper 120 is provided with a switching circuit 121 for receiving a series of the pulse signals from speed sensor 30. Each of the pulse signals from sensor 30 is reshaped by the switching circuit 121 and applied as a reshaped signal in sequence to a NAND-gate 122 of CD 4093 type manufactured by RCA Corporation in U.S.A. NAND-gate 122 has schmitt-trigger function to produce the rectangular pulse signal a (see FIG. 3) sequentially in response to each reshaped signal from switching circuit 121.

The timing signal generator 130 includes a D-flip flop 133 which is connected to the wave shaper 120 through an inverter 131 and an AND-gate 135. AND-gate 135 acts to produce a reset pulse at the leading edge of pulse signal a from wave shaper 120 upon receiving a high level signal q (see FIG. 3) from D-flip flop 133 of CD 4093 type manufactured by RCA Corporation. After reset by the reset pulse from AND-gate 135, D-flip flop 133 receives a high level signal $h_i$ (see FIG. 3) from a decade counter 134 to produce the high level signal q under control of the inverter 131 in response to the trailing edge of pulse signal a. When D-flip flop 133 is again reset by a reset signal following the above reset pulse from AND-gate 135, it makes the high level signal q a low level signal.

The timing signal generator 130 also includes a binary counter 132 of CD 4024 type manufactured by RCA Corporation. The binary counter 132 is reset by the high level signal q from D-flip flop 133 to count a series of the pulse signals a from wave shaper 120, the counter 132 producing a high level signal as the gate signal $b_i$ at its output terminal $Q_4$. The period of time $T_i$ of gate signal $b_i$ corresponds to a frequency of which is one-eighth as high as that of the pulse signal a, the leading edge of gate signal $b_i$ being in synchronization with the trailing edge of pulse signal a (see FIG. 3). The decade counter 134 is of CD 4017 type which is manufactured by RCA Corporation. When released from reset condition by an inverter 136 at the leading edge of gate signal $b_i$, the decade counter 134 counts a series of the first clock signals $C_1$ from clock circuit 110 to produce the latch signal $d_i$, the preset signal $e_i$, the reset signals $f_i$ and $g_i$ and the high level signal $h_i$ respectively at its output terminals $Q_1$, $Q_5$, $Q_6$, $Q_8$ and $Q_9$ in sequence (see FIG. 3). In the embodiment, these signals $d_i$, $e_i$, $f_i$, $g_i$ and $h_i$ are produced during generation of gate signal $b_i$, the high level signal $h_i$ becoming a low level signal when the counter 134 is reset by the inverter 136 at the trailing edge of gate signal $b_i$.

FIG. 4 illustrates a preferred embodiment of the control signal generator 140 which includes a wave shaper 141a for receiving the electric signal from set switch 40 to produce the set signal c (see FIG. 5). The set signal c is applied to a NAND-gate 141 and the distribution circuit 200. NAND-gate 141 acts to produce a high level signal in response to one of the set signal c and a low level signal from an OR-gate 147. The high level signal from NAND-gate 141 is made a low level signal when the set signal c and the low level signal from OR-gate 147 are at a high level respectively. The high or low level signal from NAND-gate 141 is applied to RS-flip flop 142 which is under control of an OR-gate 149 responsive to one of the reset signal $f_i$ from timing signal generator 130 and a reset signal from a power-on reset circuit 1407. The power-on reset circuit 1407 includes a NAND-gate 1407b which has schmitt-trigger function and is connected to a vehicle battery through a time-constant circuit 1407a. Upon receiving a DC voltage $V_B$ from the battery, the timeconstant circuit 1407a acts to produce a high level signal which has a width defined by a time-constant of circuit 1407a. The high level signal from time-constant circuit 1407a is waveformed by the schmitt-trigger function of NAND-gate 1407b into the above-noted reset signal.

After reset by an OR-gate 149 in response to the reset signal from power-on reset circuit 1407, the RS-flip flop 142 receives the high level signal from NAND-gate 141 at its set terminal S to produce a high level signal i at its output terminal Q (see FIG. 5). The high level signal i from RS-flip flop 142 is applied to a D-flip flop 143a. When the RS-flip flop 142 receives at its reset terminal R the reset signal $f_i$ from timing signal generator 130 through OR-gate 149 immediately after release of set switch 40, the high level signal i from RS-flip flop 142 is made a low level signal. After reset by the reset signal from power-on reset circuit 1407, D-flip flop 143a receives the high level signal i from RS-flip flop 142 to produce a high level signal as the command-speed set signal $j_1$ in response to the preset signal $e_i$ issued from timing signal generator 130 immediately after release of set switch 40 (see FIG. 5). The level of command-speed set signal $j_1$ from D-flip flop 143a is made a low level in response to a preset signal $e_i$ issued from timing signal generator 130 after disappearance of the high level signal i.

After reset by the reset signal from reset circuit 1407, a D-flip flop 143b receives the command-speed set signal $j_1$ from D-flip flop 143a to produce a high level signal k (see FIG. 5) in response to the latch signal $d_i$ from timing signal generator 130. The high level signal k from D-flip flop 143b is made a low level signal in response to a latch signal $d_i$ issued from timing signal generator 130 after disappearance of the command-speed set signal $j_1$. After reset by the reset signal from reset circuit 1407, a D-flip flop 143c receives the high level signal k from D-flip flop 143b to produce a high level signal in response to the latch signal $d_i$ from timing signal generator 130. The high level signal from D-flip flop 143c is applied to an RS-flip flop 144 and becomes a low level signal in response to a latch signal $d_i$ issued from timing signal generator 130 after disappearance of the high level signal k. RS-flip flop 144 receives the command-speed set signal $j_1$ from D-flip flop 143a at its reset terminal R to produce a low level signal at its output terminal Q as the operation signal m (see FIG. 5). When the RS-flip flop 144 receives the high level signal from D-flip flop 143c at its set terminal S, the operation signal m is made a high level signal by RS-flip flop 144.

The timing signal generator 140 is also provided with a wave shaper 146a for reshaping the electric signal from acceleration switch 60 and with wave shapers 145a and 148a for respectively reshaping the release and resume signals h and p from cancel and resume switches 50 and 70. The reshaped electric signal from wave shaper 146a is applied to OR-gate 147 as the above-noted low level signal and is also inverted by an inverter 146 into the acceleration signal n. The reshaped resume signal from wave shaper 148a is inverted by an inverter 148 into a high level signal. An RS-flip flop 1402 is provided to produce a low level signal at its output terminal Q upon receiving at its reset terminal R one of the reset signal and the release signal $s_1$ respectively from power-on reset circuit 1407 and cancellation circuit 150 through OR-gate 1401. When the command-speed set signal $j_1$ from D-flip flop 143a is applied to the set terminal S of RS-flip flop 1402, the low level signal from RS-flip flop 1402 is made a high level signal.

An AND-gate 1403 acts to produce a high level signal in response to the high level signals respectively from RS-flip flop 1402 and inverter 148. The high level signal from AND-gate 1403 becomes a low level signal when one of the high level signals from RS-flip flip 1402 and inverter 148 becomes a low level signal. After reset by an OR-gate 1406 responsive to the reset signal from reset circuit 1407, an RS-flip flop 1405 acts to produce a low level signal as the operation signal r under control of an OR-gate 1404 in response to one of the command-speed set signal $j_1$ from D-flip flop 143a and the high level signal from AND-gate 1403. The operation signal r is applied to OR-gate 147 as the above-noted level signal and made a high level signal by OR-gates 145, 1406 responsive to one of the reshaped release signal from wave shaper 145a and the release signal $s_2$ from cancellation circuit 150.

Figure 6:
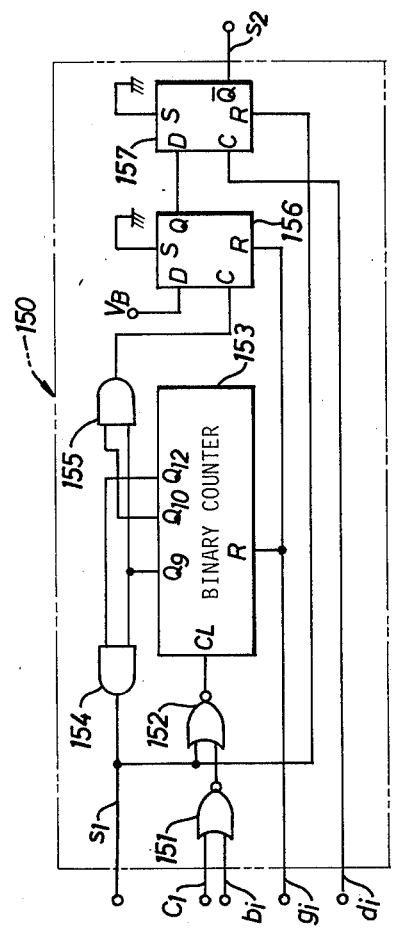
FIG. 6 is a circuit diagram of an embodiment of the cancellation circuit shown in block form in FIG. 1.

FIG. 6 illustrates a preferred embodiment of the cancellation circuit 150 which comprises a binary counter 153 connected to the clock circuit 110 and timing signal generator 130 through NOR-gates 151, 152. When each of the gate and release signals $b_i$ and $s_1$ respectively from timing signal generator 130 and an AND-gate 154 is at a low level, NOR-gates 151, 152 receive a series of the first clock signals $C_1$ from clock circuit 110 to produce the same. This means that a series of the first clock signals $C_1$ defined by the period of time $T_i$ of gate signal $b_i$ are produced from NOR-gates 151, 152 during the low level of release signal $s_1$. When the release signal $s_1$ from AND-gate 154 rises to a high level, NOR-gate 152 acts to produce a low level signal. In the embodiment, the duration defined by the low level of gate signal $b_i$ is assumed equal sustantially to the period of time $T_i$ because the width of gate signal $b_i$ is very narrow.

The binary counter 153 is of CD 4020 type which is manufactured by RCA Corporation. After reset by the reset signal $g_i$ from timing signal generator 130, the counter 153 acts to count the number of first clock signals $C_1$ which are produced in sequence from NOR-gate 152 within the period of time $T_i$ of gate signal $b_i$, a plurality of binary signals defined by the counted number being then produced from output terminals $Q_9$, $Q_{10}$ and $Q_{12}$ of counter 153 respectively. In case the counted number of counter 153 is under 768, a first high level signal is produced from the output terminal $Q_9$ of counter 153. In case the counted number of counter 153 is not less than 768 and under 2304, the counter 153 produces the first high level signal and a second high level signal respectively at the output terminals $Q_9$ and $Q_{10}$. In case the counted number of counter 153 is not less than 2304, the counter 153 also produces the first high level signal and a third high level signal respectively at the output terminals $Q_9$ and $Q_{12}$. In the embodiment, the number of under 768 corresponds to the vehicle speed of more than 120 km/h, the number of not less than 768 and under 2304 corresponds to the vehicle speed of 120 km/h or less and over 40 km/h, and the number of not less than 2304 corresponds to the vehicle speed of more than 40 km/h. Additionally, counting operation of counter 153 is inhibited in response to the low level signal from NOR-gate 152.

AND-gate 154 acts to produce a high level signal as the release signal $s_1$ in response to the first and third high level signals from counter 153. When one of the first and third high level signals from counter 153 is at a low level, the release signal $s_1$ is made a low level signal by AND-gate 154. An AND-gate 155 acts to produce a high level signal in response to the first and second high level signals from counter 153. When one of the first and second high level signals from counter 153 is at a low level, AND-gate 155 produces a low level signal. The low and high level signals from AND-gate 155 are respectively applied to a D-flip flop 156. A D-flip flop 156 serves to produce a low level signal in response to one of the reset signal $g_i$ from timing signal generator 130 and the low level signal from AND-gate 155. D-flip flop 156 also produces a high level signal in response to the high level signal from AND-gate 155. When reset by the high level signal from AND-gate 154, a D-flip flop 157 acts to produce a high level signal as the release signal $s_2$ at its output terminal $\overline{Q}$. The release signal $s_2$ from D-flip flop 157 is also produced in response to the latch signal $d_i$ from timing signal generator 130 and the low level signal from D-flip flop 156 under the low level signal from AND-gate 154. Furthermore, the release signal $s_2$ drops to a low level in response to the latch signal $d_i$ and the high level signal from D-flip flop 156 under the low level signal from AND-gate 154.

Figure 7:
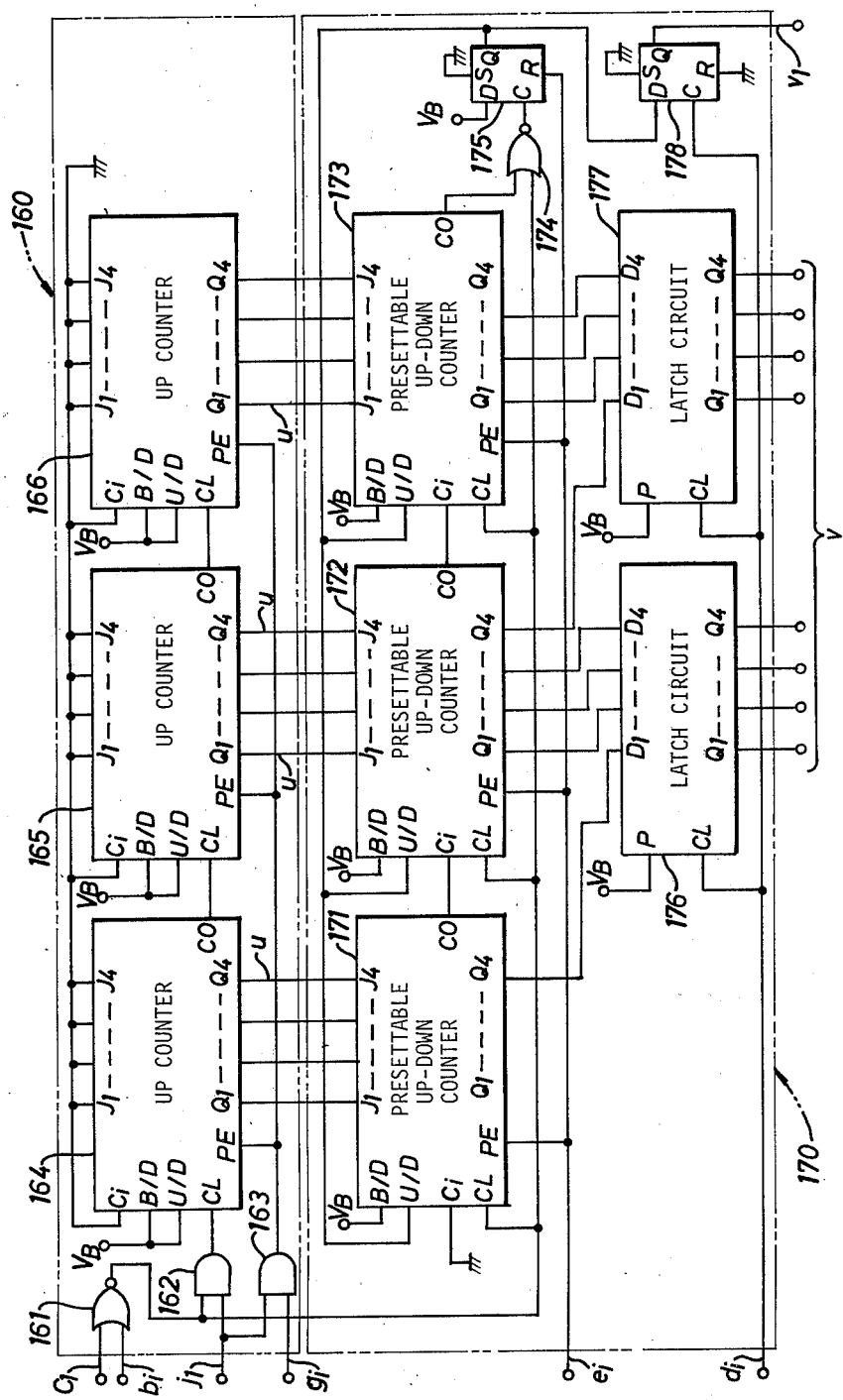
FIG. 7 is circuit diagrams of embodiments of the command-speed set circuit and speed-difference calculation circuit respectively shown in block form in FIG. 1.

In FIG. 7, there are respectively illustrated preferred embodiments of the command-speed set circuit 160 and the speed-difference calculation circuit 170. The command-speed set circuit 160 includes presettable updown counters 164, 165 and 166 which are controlled by a NOR-gate 161 and AND-gates 162, 163. NOR-gate 161 acts to produce a low level signal during generation of the gate signal $b_i$ from timing signal generator 130. While the gate signal $b_i$ remains at a low level, NOR-gate 161 produces a pulse signal in sequence in response to each of the first clock signals $C_1$ from clock circuit 110. The presettable up-down counters 164, 165 and 166 are respectively of CD 4029 type manufactured by RCA Corporation and connected, as shown in FIG. 7, to function as a twelve-bit up counter circuit. When the command-speed set signal $j_1$ appears from control signal generator 140, the counters 164, 165 and 166 are respectively reset by AND-gate 163 in response to the reset signal $g_i$ from timing signal generator 130 and cooperate with each other to count up a series of pulse signals which are issued from NOR-gate 161 through AND-gate 162. Upon completion of counting up operation in each of counters 164, 165 and 166, the counted resultant value is memorized in the counters 164, 165 and 166 as a binary signal u indicative of the period of time $T_i$ of gate signal $b_i$. This means that the binary signal u is defined by the desired or command speed of the vehicle upon closure of set switch 40. In addition, the counting up operation of counters 164, 165 and 166 is stopped upon disappearance of the pulse signals from NOR-gate 161.

The speed-difference calculation circuit 170 includes a D-flip flop 175 which is controlled by a NOR-gate 174 and the timing signal generator 130. NOR-gate 174 acts to produce a low level signal when a presettable up-down counter 173 produces a high level signal at its carry-out terminal CO, as described later. The low level signal from NOR-gate 174 rises to a high level in response to one of the pulse signals from NOR-gate 161 when the counter 173 produces a low level signal at its carry-out terminal CO. After reset by the preset signal $e_i$ from timing signal generator 130, D-flip flop 175 acts to produce low and high level signals respectively in response to the low and high level signals from NOR-gate 174.

The speed-difference calculation circuit 170 also includes presettable up-down counters 171, 172 and 173 which are respectively of CD 4029 type manufactured by RCA Corporation and connected, as shown in FIG. 7, to function as a twelve-bit up-down counter circuit. The up-down counters 171, 172 and 173 are responsive to the preset signal $e_i$ from timing signal generator 130 to preset therein the binary signal u from counters 164, 165 and 166 of set circuit 160. Then, the counters 171, 172 and 173 cooperate with each other to count down the value of binary signal u in accordance with a series of the pulse signals from OR-gate 161 under generation of the low level signal from D-flip flop 175. During this counting down operation, a high level signal is produced from the carry-out terminal CO of counter 173. In case the value of binary signal u is longer than a total period of time of a series of the pulse signals issued from NOR-gate 161 within the period of time $T_i$ of gate signal $b_i$, the counting down operation of each of counters 171, 172 and 173 is completed under generation of the low level signal from D-flip flop 175, and the counters 171, 172 and 173 produce a binary signal indicating an absolute value of a time difference between the value of binary signal u and the total period of time of the above-noted pulse signals from NOR-gate 161, the time difference having a positive sign defined by the low level signal from D-flip flop 175.

In case the value of binary signal u is shorter than the total period of time of a series of the above-noted pulse signals from NOR-gate 161, the high level signal from the carry-out terminal CO of counter 173 drops to a low level upon completion of counting down operation of counters 171, 172 and 173. The counters 171, 172 and 173 then count up a remainder of the above-noted pulse signals from NOR-gate 161 in response to the high level signal from D-flip flop 175 such that the counters 171, 172 and 173 produce a binary signal indicating an absolute value of another time difference between the value of binary signal u and the total period of time of the above-noted pulse signals from NOR-gate 161, another time difference having a negative sign defined by the high level signal from D-flip flop 175. In addition, each output signal appearing from output terminals $Q_1$, $Q_2$ and $Q_3$ of counter 171 and an output terminal $Q_4$ of counter 173 may be neglected because it is unnecessary to the embodiment.

The speed-difference calculation circuit 170 further includes a pair of latch circuits 176, 177 which are controlled by the timing signal generator 130. The latch circuits 176, 177 are responsive to the latch signal $d_i$ from timing signal generator 130 to latch and produce the binary signal from counters 171, 172 and 173 as a binary signal v. A D-flip flop 178 acts to produce a low level signal at its output terminal Q in response to the latch signal $d_i$ and the low level signal from D-flip flop 175. D-flip flop 178 also produces a high level signal in response to the latch signal $d_i$ and the high level signal from D-flip flop 175. In other words, the high level signal from D-flip flop 175 is produced from D-flip flop 178 as the sign signal $v_1$ with the high level or negative sign in response to the latch signal $d_i$, and the low level signal from D-flip flop 175 is also produced from D-flip flop 178 as the sign signal $v_1$ with the low level or positive sign in response to the latch signal $d_i$.

From the above description, it will be clearly recognized that a vehicle speed $V_s$ satisfies the following equation (1) in relation to the period of time $T_i$ of gate signal $b_i$ from timing signal generator 130.

$$T_i = \beta/V_s \ldots \quad (1)$$

where the character $\beta$ indicates a constant. Assuming that the vehicle command-speed upon closure of the set switch 40 is $V_{so}$ and that an actual vehicle speed is $(V_{so} - \Delta V_s)$, a time difference $\Delta T$ is represented by the following equation (2).

$$T = \beta \left( \frac{1}{V_{so} - \Delta V_s} - \frac{1}{V_{so}} \right) \quad (2)$$

$$= \frac{\beta \Delta V_s}{(V_{so} - \Delta V_s) V_{so}}$$

$$\approx \frac{\beta \Delta V_s}{V_{so}^2} \quad (\because V_{so}^2 \gg \Delta V_s V_{so})$$

where the character $\Delta V_s$ indicates a difference between the vehicle command-speed $V_{so}$ and the actual vehicle speed. This means that the time difference $\Delta T$ is substantially proportional to the speed difference $\Delta V_s$. Consequently, it should be understood that the binary signal v from the latch circuits 176, 177 indicates the time difference $\Delta T$ corresponding with the speed difference $\Delta V_s$.

Figure 8:
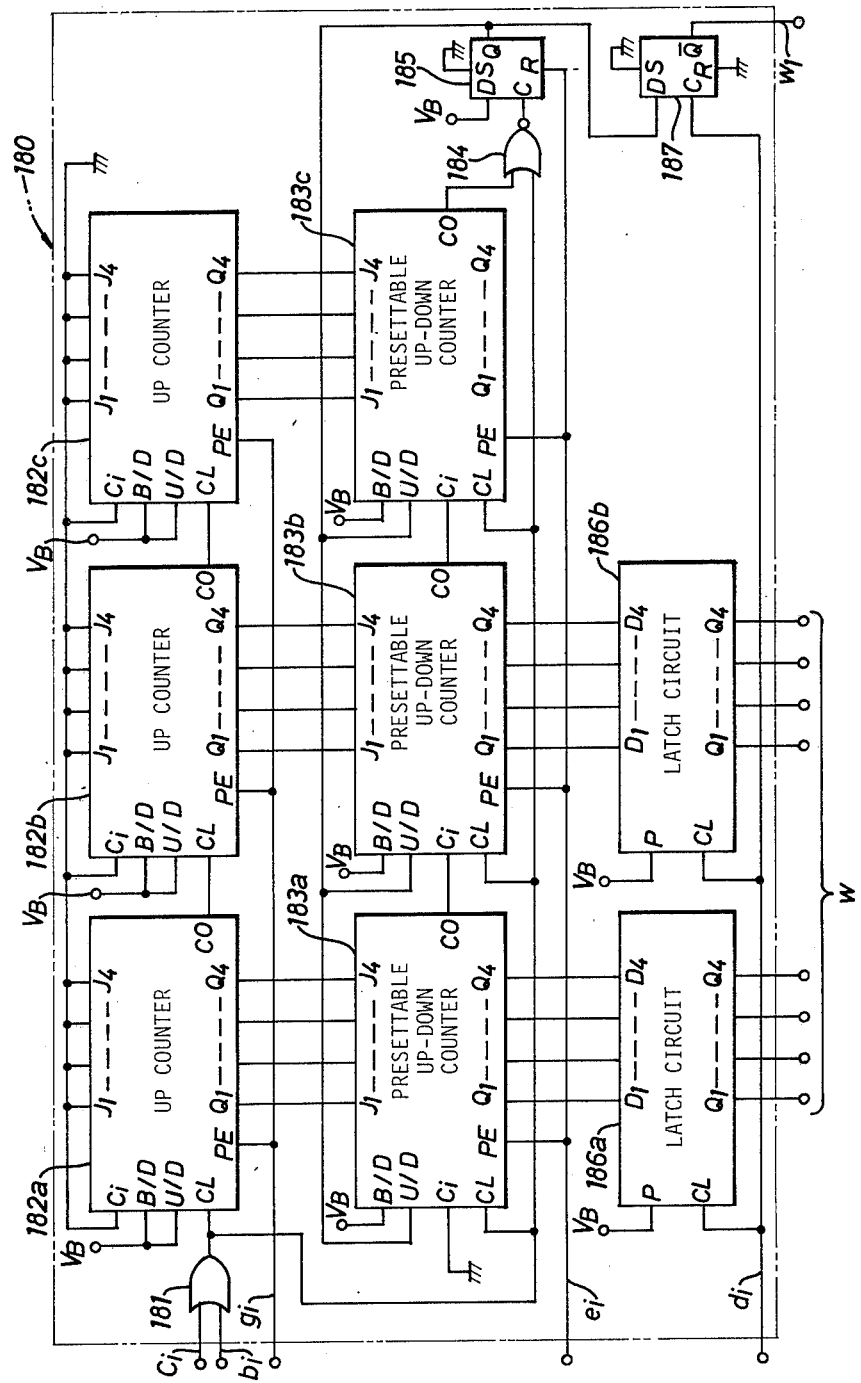
FIG. 8 is a circuit diagram of an embodiment of the acceleration calculation circuit shown in block form in FIG. 1.

FIG. 8 illustrates a preferred embodiment of the acceleration calculation circuit 180 which includes presettable up-down counters 182a, 182b and 182c controlled by an OR-gate 181 and the timing signal generator 130. The presettable up-down counters 182a to 182c are respectively of CD 4029 type manufactured by RCA Corporation and connected, as shown in FIG. 8, to function as a twelve-bit up counter circuit. After reset by the reset signal $g_i$ from timing signal generator 130, the counters 182a to 182c cooperate with each other to count up a series of the first clock signals $C_1$ which are issued from clock circuit 110 through OR-gate 181 during the low level of gate signal $b_i$. Upon completion of this counting up operation, the counted resultant value is latched and applied from the counters 182a to 182c to presettable up-down counters 183a, 183b and 183c as a binary signal indicative of the period of time $T_i$ of gate signal $b_i$.

The acceleration calculation circuit 180 also includes a D-flip flop 185 which is controlled by a NOR-gate 184 and the timing signal generator 130. NOR-gate 184 acts to produce a low level signal in response to a series of the first clock signals $C_1$ from OR-gate 181 and a high level signal which is issued from a carry-out terminal CO of the counter 183c, as described later. NOR-gate 184 also produces a pulse signal with a high level in response to one of the first clock signals $C_1$ and a low level signal from the carry-out terminal CO of counter 183c. After reset by the preset signal $e_i$ from timing signal generator 130, D-flip flop 185 acts to produce low and high level signals at its output terminal Q respectively in response to the low and high level signals from NOR-gate 184.

The presettable up-down counters 183a, 183b and 183c are respectively of CD 4029 type manufactured by RCA Corporation and connected, as shown in FIG. 8, to function as a twelve-bit up-down counter circuit. The up-down counters 183a to 183c are responsive to preset signal $e_i$ from timing signal generator 130 to preset therein the binary signal from counters 182a to 182c. Then, the counters 183a to 183c cooperate with each other to count down the value of the preset binary signal in accordance with a series of the first clock signals $C_1$ from OR-gate 181 under generation of the low level signal from D-flip flop 185. During this counting down operation, the counter 183c acts to produce the above-noted high level signal at its carry-out terminal CO. In case the value of binary signal from counters 182a to 182c is longer than a total period of time of a series of the first clock signals $C_1$ issued from OR-gate 181 within the period of time $T_i$ of gate signal $b_i$, the counting down operation of each of counters 183a to 183c is completed under generation of the low level signal from D-flip flop 185 such that the counters 183a, 183b produces a binary signal indicating an absolute value of a time difference between the value of binary signal from counters 182a to 182c and the total period of time of the above-noted first clock signals $C_1$, the time difference having a positive sign defined by the low level signal from D-flip flop 185.

In case the value of binary signal from counters 182a to 182c is shorter than the total period of time of the above-noted first clock signals $C_1$ from OR-gate 181, the high level signal from the carry-out terminal CO of counter 183c drops to a low level upon completion of counting down operation of counters 183a to 183c. The counters 183a to 183c then count up a remainder of a series of the above-noted first clock signals $C_1$ in response to the high level signal from D-flip flop 185 such that the counters 183a, 183b produce a binary signal indicating an absolute value of another time difference between the value of binary signal from counters 182a to 182c and the total period of time of the above-noted first clock signals $C_1$, another time difference having a negative sign defined by the high level signal from D-flip flop 185. In addition, output signals from output terminals $Q_1$ to $Q_4$ of counter 183c are neglected because they are considered to be unnecessary in the embodiment.

The acceleration calculation circuit 180 further includes a pair of latch circuits 186a, 186b which are controlled by the timing signal generator 130. The latch circuits 186a, 186b are responsive to the latch signal $d_i$ from timing signal generator 130 to latch and produce the binary signal from counters 183a, 183b as a binary signal w. A D-flip flop 187 acts to produce a high level signal at its output terminal $\overline{Q}$ in response to the latch signal $d_i$ and the low level signal from D-flip flop 185. D-flip flop 187 also produces a low level signal in response to the latch signal $d_i$ and the high level signal from D-flip flop 185. In other words, the high level signal from D-flip flop 185 is produced from D-flip flop 187 as the sign signal $w_1$ with a low level or negative sign in response to the latch signal $d_i$, and the low level signal from D-flip flop 185 is produced from D-flip flop 187 as the sign signal $w_1$ with a high level or positive sign in response to the latch signal $d_i$.

Figure 9:
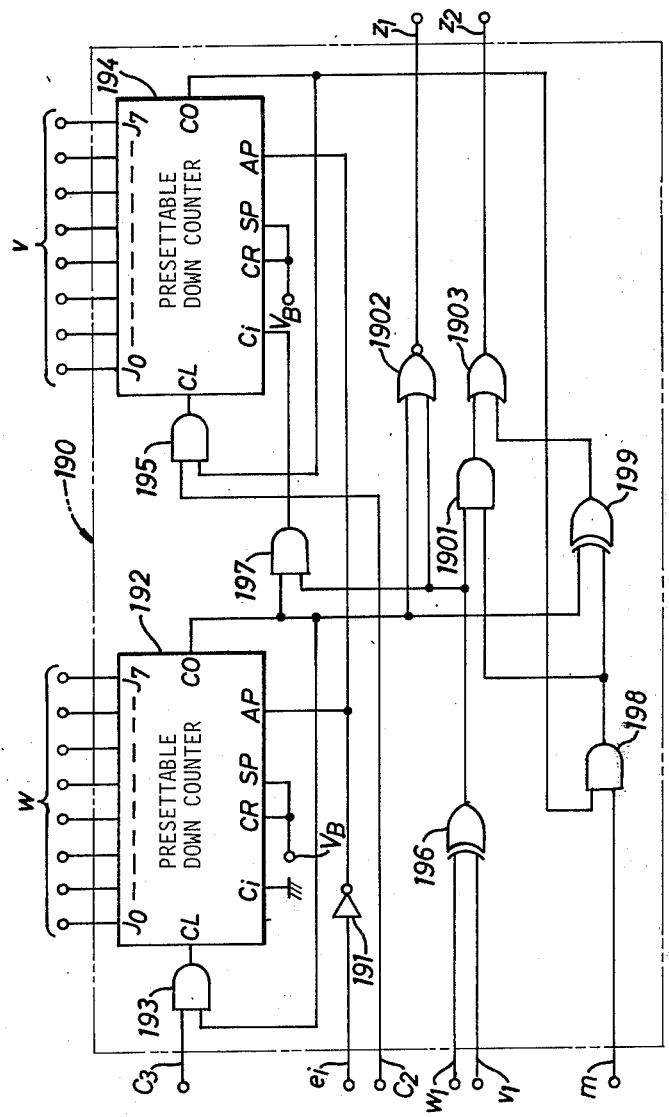
FIG. 9 is a circuit diagram of an embodiment of the correction signal generator shown in block form in FIG. 1.

In FIG. 9, there is illustrated a preferred embodiment of the correction signal generator 190 which includes a presettable down counter 192 of CD 40103 type manufactured by RCA Corporation. The counter 192 is provided with jam input terminals $J_0$ to $J_7$ for receiving the binary signal w from latch circuits 186a, 186b and with an asynchronous preset-enable terminal AP controlled by an inverter 191 responsive to the preset signal $e_i$ from timing signal generator 130. The counter 192 is also provided with clear and synchronous preset-enable terminals CR and SP respectively for receiving the DC voltage $V_B$ from the vehicle battery and with a clock terminal CL for receiving a series of the third clock signals $C_3$ issued from clock circuit 110 through an AND-gate 193 while the counter 192 produces a high level signal at its carry-out terminal CO, as described later, a carry-in terminal $C_i$ of counter 192 being grounded. The down counter 192 serves to preset therein the binary signal w under control of inverter 191 responsive to generation of preset signal $e_i$. When the preset signal $e_i$ from timing signal generator 130 disappears, the counter 192 starts to count down a value of binary signal w due to function of inverter 191 in accordance with a series of the clock signals $C_3$ from AND-gate 193 and produces the high level signal at its carry-out terminal CO. Upon counting the value of binary signal w down to zero, the high level signal from the carry-out terminal CO of counter 192 drops to a low level to inhibit the counting operation of counter 192 under control of AND-gate 193. The above-noted operation in counter 192 is repeated in response to each preset signal $e_i$ from timing signal generator 130 such that a high level signal with a width corresponding to the value of binary signal w is repetitively produced from the carry-out terminal CO of counter 192.

The correction signal generator 190 also includes a presettable down counter 194 of CD 40103 type which is manufactured by RCA Corporation. The down counter 194 is provided with jam input terminals $J_0$ to $J_7$ for receiving the binary signal v from latch circuits 176, 177 and with a carry-in terminal $C_i$ controlled by an AND-gate 197 responsive to each function of the down counter 197 and an exclusive OR-gate 196. The down counter 194 is also provided with a clock terminal CL for receiving a series of the second clock signals $C_2$ issued from clock circuit 110 through an AND-gate 195 while the counter 194 produces a high level signal at its carry-out terminal CO, as described later. Other constructions of the down counter 194 is the same as those of the down counter 192. The exclusive OR-gate 196 serves to produce a low level signal when each of the sign signals $V_1$ and $w_1$ respectively from the speed-difference and acceleration calculation circuits 170 and 180 has a low or high level. The exclusive OR-gate 196 also produces a high level signal when one of the sign signals $v_1$ and $w_1$ has a high level and the other sign signal has a low level. In other words, the high level signal appears from the exclusive OR-gate 196 when each sign of the sign signals $v_1$ and $w_1$ is identical to each other. The low level signal also appears from the exclusive OR-gate 196 when each sign of the sign signals $v_1$ and $w_1$ is opposite to each other.

The down counter 194 serves to preset therein the binary signal v under control of inverter 191 upon generation of the preset signal $e_i$ from timing signal generator 130 and produces the high level signal at its carry-out terminal CO while counting down operation of counter 194 is inhibited by AND-gate 197 responsive to the high level signals from down counter 192 and exclusive OR-gate 196. When the counting down operation of counter 194 is permitted by AND-gate 197 responsive to one of the low level signals from down counter 192 and exclusive OR-gate 196, the down counter 194 starts to count down the value of binary signal v in accordance with a series of the second clock signals $C_2$ from AND-gate 195 due to function of inverter 191 based on disappearance of the preset signal $e_i$. During this counting down operation, the high level signal is continuously produced from the carry-out terminal CO of counter 194. Upon counting the value of binary signal v down to zero, the high level signal from the carry-out terminal CO of counter 194 drops to a low level to inhibit the counting down operation of counter 194 under control of AND-gate 195. The above-noted operation in counter 194 is repeated in response to each preset signal $e_i$ from timing signal generator 130 such that a high level signal with a width corresponding to the value of binary signal v or to a total of the values of binary signals v, w is repetitively produced from the carry-out terminal CO of counter 194.

A NOR-gate 1902 is provided to produce a low level signal as the first correction signal $z_1$ in response to one of the high level signals from the down counter 192 and exclusive OR-gate 196. When each of the counter 192 and exclusive OR-gate 196 produces the low level signal, a high level signal is produced from NOR-gate 1902 as the first correction signal $z_1$. In other words, when each sign of sign signals $v_1$, $w_1$ is identical to each other, the first correction signal $z_1$ is at the low level during counting down operation of counter 192 and rises to the high level upon completion of the counting down operation of counter 192. This means that the first correction signal $z_1$ of low level has a width corresponding to the value of binary signal w. When each sign of sign signals $v_1$, $w_1$ is opposite to each other, the first correction signal $z_1$ remains at the low level regardless of operation of down counter 192.

An AND-gate 198 acts to produce a high level signal in response to both of the high level signal from down counter 194 and the operation signal m of high level from control signal generator 140. The high level signal from AND-gate 198 drops to a low level when one of the operation signal m and the high level signal from counter 194 drops to the low level. An AND-gate 1901 serves to produce a high level signal in response to both of the high level signals from the exclusive OR-gate 196 and AND-gate 198. The high level signal from AND-gate 1901 drops to a low level when one of the high level signals from the exclusive OR-gate 196 and AND-gate 198 drops to the low level. An exclusive OR-gate 199 acts to produce a low level signal in response to the low or high level signals from the down counter 192 and AND-gate 198. The low level signal from exclusive OR-gate 199 rises to a high level when one of the low and high level signals is produced from the down counter 192 and the other signal is produced from AND-gate 198. An OR-gate 1903 is responsive to at least one of the high level signals from the exclusive OR-gate 199 and AND-gate 1901 to produce a high level signal as the second correction signal $z_2$. The second correction signal $z_2$ of high level from OR-gate 1903 drops to a low level when both of the high level signals from the exclusive OR-gate 199 and AND-gate 1901.

In other words, while the operation signal m is at the low level, the second correction signal $z_2$ remains at the high level during the counting down operation of counter 192 and drops to the low level upon completion of the counting down operation of counter 192. This means that the second correction signal $z_2$ of high level has a width corresponding to the value of binary signal w regardless of function of the exclusive OR-gate 196. When the operation signal m is at the high level and the sign signals $v_1$, $w_1$ are at the identical level to each other, the correction signal $z_2$ remains at the low level during the counting down operation of each of counters 192, 194 and rises to the high level upon completion of the counting down operation in one of counters 192, 194. This means that the correction signal $z_2$ has a width corresponding to an absolute value $|w-v|$ of a difference between each value of binary signals v, w. When the operation signal m is at the high level and the sign signals $v_1$, $w_1$ are at an opposite level to each other, the correction signal $z_2$ remains at the high level during the counting down operation of counter 192 and also during the counting down operation of counter 194 caused by completion of the counting down operation of counter 192, the correction signal $z_2$ dropping to the low level upon completion of the counting down operation of counter 194. This means that the correction signal has a width corresponding to an absolute value $|v+w|$ of a total value of binary signals v, w.

Figure 10:
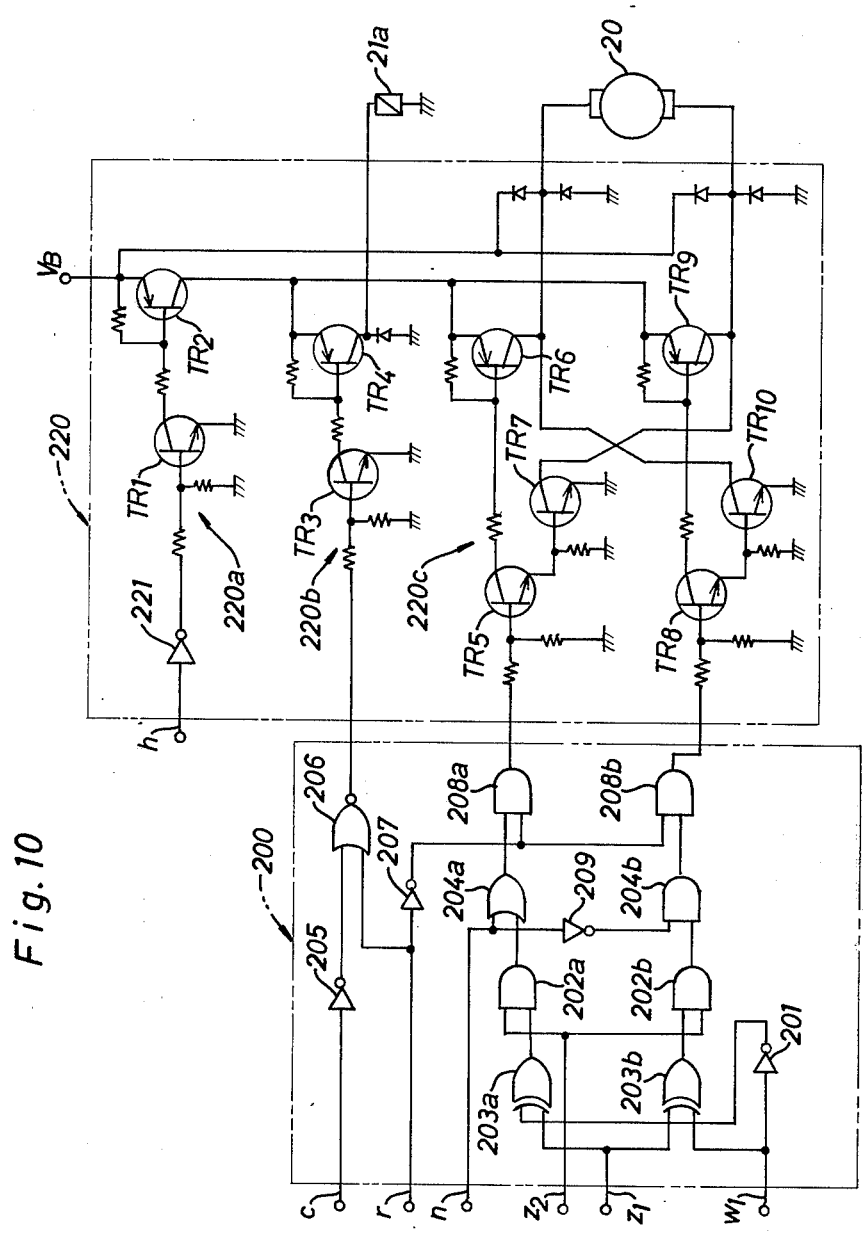
FIG. 10 is circuit diagrams of embodiments of the distribution and drive circuits respectively shown in block form in FIG. 1.

In FIG. 10, there are illustrated preferred embodiments of the distribution circuit 200 and drive circuit 220. The distribution circuit 200 comprises a NOR-gate 206 from which a high level signal is produced as the first distribution signal under function of an inverter 205 based on release of set switch 40 when the operation signal r from control signal generator 140 is at the low level. The first distribution signal from NOR-gate 206 drops to a low level upon closure of set switch 40 and also to the low level when the operation signal r rises to the high level. An inverter 201 is provided to invert the sign signal $w_1$ from acceleration calculation circuit 180. The inverter sign signal from inverter 201 is applied to an exclusive OR-gate 203a. The exclusive OR-gate 203a acts to produce a low level signal when the first correction signal $z_1$ from correction signal generator 190 has the same level as that of the inverted sign signal from inverter 201. The exclusive OR-gate 203a also produces a high level signal when the first correction signal $z_1$ has a level opposite to that of the inverted sign signal from inverter 201.

The distribution circuit 200 also comprises an AND-gate 202a which acts to produce a high level signal in response to the high level signal from exclusive OR-gate 203a when the second correction signal $z_2$ from correction signal generator 190 is at the high level. The high level signal form AND-gate 202a drops to a low level when one of the second correction signal $z_2$ and the high level signal from exclusive OR-gate 203a drops to the low level. An inverter 207 acts to invert the operation signal r from control signal generator 140. When the inverted operation signal from inverter 207 is at a high level, an AND-gate 208a serves to produce a high level signal as the second distribution signal in response to one of the acceleration signal n and high level signal respectively issued from control signal generator 140 and AND-gate 202a through an OR-gate 204a. The second distribution signal from AND-gate 208a drops to a low level when one of the acceleration signal n and the high level and inverted operation signals from AND-gate 202a and inverter 207 drops to a low level.

An exclusive OR-gate 203b is provided to produce a low level signal when the sign and correction signals $w_1$, $z_1$ from acceleration calculation circuit 180 and correction signal generator 190 are at an identical level to each other. The exclusive OR-gate 203b also produces a high level signal when the sign and correction signals $w_1$, $z_1$ are at an opposite level to each other. An AND-gate 202b serves to produce a high level signal in response to the high level signal from exclusive OR-gate 203b when the second correction signal $z_2$ from correction signal generator 190 is at the high level. AND-gate 202b also produces a low level signal when one of the second correction signal $z_2$ and the high level signal from exclusive OR-gate 203b drops to the low level. An AND-gate 204b acts to produce a low level signal under function of an inverter 209 responsive to the acceleration signal n regardless of function of AND-gate 202b. AND-gate 204b also produces a high level signal in response to the high level signal from AND-gate 202b under function of inverter 209 caused by disappearance of the acceleration signal n. When the inverted operation signal from inverter 207 is at a high level, an AND-gate 208b is responsive to the high level signal from AND-gate 204b to produce a high level signal as the third distribution signal. The third distribution signal from AND-gate 208b drops to a low level when one of the high level and inverted operation signals from AND-gate 204b and inverter 207 drops to the low level.

In summary, the first to third distribution signals are respectively derived from distribution circuit 200 in relation to the set, acceleration and operation signals c, n, m and r from control signal generator 140 and also to the binary and sign signals v, w and $v_1$, $w_1$ from calculation circuits 170, 180 and the correction signals $z_1$, $z_2$ from correction signal generator 190, as follows.

(1) In case of the operation signal r with high level:
The distribution circuit 200 acts to produce each of the first to third distribution signals respectively with low level.

(2) In case of the operation and set signals r and c respectively with low level:
The distribution circuit 200 acts to produce the first distribution signal with low level.

(3) In case of the operation signal r with a level opposite to that of the set signal c:
The distribution circuit 200 acts to produce the first distribution signal with high level.

(4) In case of the operation signal r with low level:
The distribution circuit 200 is responsive to the acceleration signal n to produce the second distribution signal with high level and the third distribution signal with low level.

(5) In case of the acceleration and operation signals n, m and r respectively with low level:
The distribution circuit 200 is responsive to the sign and correction signals $w_1$, $z_1$ respectively with low level to produce the second distribution signal with high level and the third distribution signal with low level, a width of the second distribution signal corresponding to the value of binary signal w which defines the width of correction signal $z_2$ with high level. The distribution circuit 200 is also responsive to the sign signal $w_1$ with high level and the correction signal $z_1$ with low level to produce the second distribution signal with low level and the third distribution signal with high level, a width of the third distribution signal corresponding to the value of binary signal w which defines the width of correction signal $z_2$.

(6) In case of the operation signal m with high level and the acceleration and operation signals n, r respectively with low level:

When the sign signals $v_1$ and $w_1$ have the high and low levels respectively, the distribution circuit 200 is responsive to the sign and correction signals $w_1$, $z_1$ respectively with low level to produce the second distribution signal with high level and the third distribution signal with low level, a width of the second distribution signal corresponding to the total value of binary signals v and w which defines the width of correction signal $z_2$. When the sign signals $v_1$ and $w_1$ have the low and high levels respectively, the distribution circuit 200 is responsive to the sign signal $w_1$ with high level and the correction signal $z_1$ with low level to produce the second distribution signal with low level and the third distribution signal with high level, a width of the third distribution signal corresponding to the total value of binary signals v and w which defines the width of correction signal $z_2$.

(7) In case of the operation signal m with high level and the acceleration and operation signals n and r respectively with low level:

When the value of binary signal w is larger than that of binary signal v under the low level of each of sign signals $v_1$, $w_1$, the distribution circuit 200 is responsive to the sign and correction signals $w_1$, $z_1$ respectively with low level to produce the second distribution signal with high level and the third distribution signal with low level, a width of the second distribution signal corresponding to the absolute value of the difference of each value of binary signals v, w which defines the correction signal $z_2$. When the value of binary signal w is smaller than that of binary signal v under the low level of each of sign signals $v_1$, $w_1$, the distribution circuit 200 is responsive to the sign signal $w_1$ with low level and the correction signal $z_1$ with high level to produce the second distribution signal with low level and the third distribution signal with high level, a width of the third distribution signal corresponding to the absolute value of the difference of each value of binary signals v, w which defines the correction signal $z_2$.

When the value of binary signal w is larger than that of binary signal v under the high level of each of sign signals $v_1$, $w_1$, the distribution circuit 200 is responsive to the sign signal $w_1$ with high level and the correction signal $z_1$ with low level to produce the second distribution signal with low level and the third distribution signal with high level, a width of the third distribution signal corresponding to the absolute value of the difference to each value of binary signal v, w which defines the correction signal $z_2$. When the value of binary signal w is smaller than that of binary signal v under the high level of each of sign signals $v_1$, $w_1$, the distribution circuit 200 is responsive to the sign and correction signals $w_1$ and $z_1$ respectively with high level to produce the second distribution signal with high level and the third distribution signal with low level, a width of second distribution signal corresponding to the absolute value of the difference of each value of binary signals v, w which defines the correction signal $z_2$.

The drive circuit 220 comprises a first transistor circuit 220a which is controlled by the cancel switch 50. The first transistor circuit 220a includes a transistor $TR_1$ which is turned on under function of an inverter 221 based on release of the cancel switch 50 such that a transistor $TR_2$ is made conductive to supply the DC voltage $V_B$ from the vehicle battery to second and third transistor circuits 220b, 220c. The transistor $TR_1$ is turned off under function of inverter 221 responsive to appearance of the release signal h from cancel switch 50 such that the transistor $TR_2$ is made nonconductive to block the supply of DC voltage $V_B$ from the vehicle battery to the transistor circuits 220b, 220c. The second transistor circuit 220b includes a transistor $TR_3$ which is turned on in response to the first distribution signal of high level from NOR-gate 206 of distribution circuit 200 such that a transistor $TR_4$ is made conductive to produce the above-noted first drive signal under conduction of the transistor $TR_2$. The transistor $TR_3$ is turned off in response to the first distribution signal of low level such that the transistor $TR_4$ is made nonconductive to cease generation of the first drive signal.

The third transistor circuit 220a includes a transistor $TR_5$ which in turned on in response to the second distribution signal of high level from AND-gate 208a of distribution circuit 200 such that each of transistors $TR_7$, $TR_6$ is made conductive to produce the above-noted second drive signal from a collector of transistor $TR_6$. The transistor $TR_5$ is turned off in response to the second distribution signal of low level such that each of transistors $TR_7$, $TR_6$ is made nonconductive to cease generation of the second drive signal. The third transistor circuit 220a also includes a transistor $TR_8$ which is turned on in response to the third distribution signal of high level from AND-gate 208b of distribution circuit 200 such that each of transistor $TR_{10}$, $TR_9$ is made conductive to produce the above-noted third drive signal from a collector of transistor $TR_9$. The transistor $TR_8$ is turned off in response to the third distribution signal of low level such that each of transistors $TR_{10}$, $TR_9$ is made nonconductive to cease generation of the third drive signal. In addition, nonconduction of transistor $TR_2$ ceases generation of each of the first to third drive signals.

OPERATION

When the vehicle starts to travel on a flat road upon depression of the accelerator pedal 25 and the speed control system is ready for operation, the throttle valve 12 remains at an opening angle defined by the depression of accelerator pedal 25. Each of the reversible motor 20 and clutch mechanism 21 is also maintained inoperative because the drive circuit 220 may not yet produce any drive signals under control of distribution circuit 200 responsive to an operation signal r of a high level issued from the control signal generator 140, as understood from the previous description.

At this stage, the cancellation circuit 150 is controlled by the timing signal generator 130 to repetitively produce a pair of release signals $s_1$, $s_2$ respectively with a high level in accordance with a series of the clock signals $C_1$ from clock circuit 110, each of the release signals $s_1$, $s_2$ dropping to a low level when the actual vehicle speed exceeds 40 km/h, as previously described. The control signal generator 140 is responsive to the release signals $s_1$, $s_2$ from cancellation circuit 150 to produce the abovenoted operation signal r of high level and also responsive to the operation signal r under control of the timing signal generator 130 to produce an operation signal m of a high level, as previously described. Furthermore, the acceleration calculation circuit 180 is controlled by the timing signal generator 130 to repetitively latch and produce binary and sign signals w, $w_1$ in accordance with a series of the first clock signals $C_1$ from clock circuit 110, as previously described.

When the set switch 40 is temporarily closed upon reach of the actual vehicle speed to a desired or command value during acceleration of the vehicle, an electric signal is produced from the set switch 40 and reshaped by the wave shaper 141a of control signal generator 140 into a set signal c (see FIG. 5). When RS-flip flop 142 produces a high level signal i under function of NAND-gate 141 responsive to the set signal c, the high level signal i is applied to D-flip flop 143a of control signal generator 140. Assuming that immediately after disappearance of set signal c, the timing signal generator 130 produces a gate signal $b_1$ with a period of time $T_1$ and also produces latch and preset signals $d_1$, $e_1$ and reset signals $f_1$, $g_1$, as previously described, an absolute value of a time difference counted previously in the counters 183a, 183b of calculation circuit 180 is latched and applied by the latch circuits 186a, 186b as a binary signal w to the correction signal generator 190 in response to the latch signal $d_1$. At the same time, a sign signal $w_1$ is produced from D-flip flop 187 and applied to the correction signal generator 190 and distribution circuit 200. At this stage, the sign signal $w_1$ has a positive sign defined by a high level because of acceleration of the vehicle.

When D-flip flop 143a of control signal generator 140 receives the preset signal $e_1$ under generation of the high level signal i from RS-flip flop 142, it produces a command-speed set signal $j_1$ which is applied to D-flip flop 143b, RS-flip flops 144, 1402 and OR-gate 1404 and also to the command-speed set circuit 160. Then, the operation signal m with high level appearing from RS-flip flop 144 of control signal generator 140 drops to a low level in response to the command-speed set signal $j_1$ from D-flip flop 143a, and simultaneously the operation signal r with high level appearing from RS-flip flop 1405 of control signal generator 140 drops to a low level such that a first distribution signal is produced from NOR-gate 206 of distribution circuit 200. Thus, the second transistor circuit 220b of drive circuit 220 produces a first drive signal in response to the first distribution signal from NOR-gate 206 to energize the electromagnetic coil 21a of clutch mechanism 21. As a result, the clutch mechanism 21 is engaged due to the energization of coil 21a to connect the rack-and-pinion 22 with the reversible motor 20. Additionally, the high level signal i from RS-flip flop 142 of control signal generator 140 drops to a low level in response to the reset signal $f_1$ from timing signal generator 130.

When the up-down counters 183a to 183c of acceleration calculation circuit 180 receives the preset signal $e_1$ from timing signal generator 130, they preset therein a value counted previously in the up counters 182a to 182c as a binary signal and start to count down the same value at the trailing edge of gate binary $b_1$ in accordance with a series of the first clock signals $C_1$ from OR-gate 181. When the down counter 192 of correction signal generator 190 preset therein the binary signal w from calculation circuit 180 under control of inverter 191 responsive to the preset signal $e_1$, it starts to count down the same value in accordance with a series of the third clock signals $C_3$ from AND-gate 193 and produces a high level signal at its carry-out terminal CO. Then, NOR-gate 1902 is responsive to the high level signal from down counter 192 to produce a first correction signal $z_1$ of a low level, and the exclusive OR-gate 199 receives the high level signal from counter 192 under control of AND-gate 198 responsive to the operation signal m of low level from control signal generator 140 and produces a high level signal such that a second correction signal $z_2$ of a high level appears from OR-gate 1903.

When the distribution circuit 200 receives the correction signals $z_1$ and $z_2$ respectively with low and high levels, it produces a third distribution signal of a high level in relation to the high level of sign signal $w_1$ so that the transistors $TR_8$, $TR_9$ and $TR_{10}$ of drive circuit 220 are made conductive to produce a third drive signal from the transistor $TR_9$, as previously described. Thus, the reversible motor 20 is rotated upon receiving the third drive signal from drive circuit 220 and operates the rack-and-pinion 22 to decrease the actual opening angle of throttle valve 12. As a result, restraint to the actual acceleration of the vehicle is initiated due to the decrease of the throttle opening angle to control the actual vehicle speed toward the desired value.

In the command-speed set circuit 160, the up counters 164 to 166 are reset by AND-gate 163 responsive to the reset signal $g_1$ from timing signal generator 130 under generation of the command-speed set signal $j_1$ and start to count a series of the first clock signals $C_1$ from NOR-gate 161 at the trailing edge of gate signal $b_1$. In the acceleration calculation circuit 180, the up counters 182a to 182c are reset by the reset signal $g_1$ from timing signal generator 130 and start to count a series of the first clock signals $C_1$ from OR-gate 181 at the trailing edge of gate signal $b_1$. Additionally, RS-flip flop 1402 of control signal generator 140 is responsive to the command-speed set signal $j_1$ from D-flip flop 143a to produce a high level signal to be applied to AND-gate 1403.

Upon completion of the counting down operation of counter 192, the high level signal from counter 192 drops to a low level so that the correction signal $z_2$ of high level from OR-gate 1903 drops to a low level under function of the exclusive OR-gate 199. Then, the third distribution signal with high level from distribution circuit 200 drops to a low level in response to the correction signal $z_2$ of low level from OR-gate 1903 to make the transistors $TR_8$, $TR_9$ and $TR_{10}$ of drive circuit 220 nonconductive. Thus, the rotation of reversible motor 20 is stopped due to the nonconductive of transistors $TR_8$, $TR_9$ and $TR_{10}$ such that the operation of rack-and-pinion 22 is halted to cease the decrease of the throttle opening angle.

When the timing signal generator 130 produces a gate signal $b_2$ with a period of time $T_2$ and also produces latch and preset signals $d_2$, $e_2$ and reset signals $f_2$, $g_2$, as previously described, each counting operation of counters 164 to 166 and 182a to 182c of circuits 160 and 180 is completed at the leading edge of gate signal $b_2$, and simultaneously each counting down operation of counters $183a$ to $183c$ of circuit 180 is completed. At this stage, the period of time $T_2$ of gate signal $b_2$ is assumed to be a little shorter than that of the gate signal $b_1$ in consideration with the above-noted restraint to acceleration of the vehicle. Then, the period of time $T_1$ of gate signal $b_1$ is memorized by the counters 164 to 166 as a binary signal u and is also produced from the up counters $182a$ to $182c$ as a binary signal. At the same time, a time difference between the period of time $T_1$ and the previously counted value in counters $182a$ to $182c$ described above is produced as a binary signal from up-down counters $183a$, $183b$, and a low level signal is also produced from D-flip flop 185. In addition, the period of time $T_1$ is assumed to be shorter than the previously counted value in counters $182a$ to $182c$ described above because of acceleration of the vehicle.

Upon receiving the latch signal $d_2$ from timing signal generator 130, D-flip flop $143b$ of control signal generator 140 acts to produce a high level signal k (see FIG. 5) under generation of the command-speed set signal $j_1$ from D-flip flop $143a$. In the acceleration calculation circuit 180, the above-noted binary signal from up-down counters $183a$, $183b$ is latched by the latch circuits $186a$, $186b$ in response to the latch signal $d_2$ and applied to the correction signal generator 180 as a binary signal w, and simultaneously the low level signal from D-flip flop 185 is inverted by D-flip flop 187 and applied to the correction signal generator 190 and distribution circuit 200 as a sign signal $w_1$ with a high level or a positive sign. When the preset signal $e_2$ from timing signal generator 130 is applied to the speed-difference and acceleration calculation circuits 170 and 180, the up-down counters 171 to 173 of calculation circuit 170 preset therein the binary signal u from command-speed set circuit 160 and start to count down a value of binary signal u at the trailing edge of gate signal $b_2$ in accordance with a series of the first clock signals $C_1$ from NOR-gate 161. Simultaneously, the up-down counters $183a$ to $183c$ of calculation circuit 180 preset therein the binary signal from counters $182a$ to $182c$ and start to count down a value of the same binary signal at the trailing edge of gate signal $b_2$ in accordance with a series of the first clock signals $C_1$. At this stage, D-flip flops 175, 185 of circuits 170, 180 act to produce a low level signal respectively.

Upon presetting therein the binary signal w from acceleration calculation circuit 180 in response to the preset signal $e_2$, the down counter 192 of correction signal generator 190 starts to count down a value of the binary signal w and produces a high level signal at its carry-out terminal CO, as previously described. Then, NOR-gate 1902 and OR-gate 1903 act to produce first and second correction signals $z_1$ and $z_2$ with low and high levels respectively, as previously described. Thus, the distribution circuit 200 cooperates with the transistors $TR_8$ to $TR_{10}$ of drive circuit 220 in response to the correction signals $z_1$ and $z_2$ respectively with low and high levels so that the above-noted rotation of reversible motor 20 is conducted in relation to the high level of sign signal $w_1$ to decrease the actual throttle opening angle, as previously described. This also results in restraint to acceleration of the vehicle. Upon completion of the counting down operation of counter 192, the second correction signal $z_2$ of high level from OR-gate 1903 drops to a low level so that the distribution circuit 200 cooperates with the transistors $TR_8$, $TR_9$ and $TR_{10}$ of drive circuit 220 to halt the rotation of reversible motor 20. Additionally, in the acceleration calculation circuit 180, the up counters $182a$ to $182c$ are reset by the reset signal $g_2$ from timing signal generator 130 and start to count a series of the first clock signals $C_1$ at the trailing edge of gate signal $b_2$.

When the timing signal generator 130 produces a gate signal $b_3$ with a period of time $T_3$ and also produces latch and preset signals $d_3$, $e_3$ and reset signals $f_3$, $g_3$, as previously described, each counting operation of counters $182a$ to $182c$ of circuit 180 is completed at the leading edge of gate signal $b_3$. Simultaneously, each counting down operation of up-down counters 171 to 173 and $183a$ to $183c$ of circuits 170 and 180 is completed. At this stage, the period of time $T_3$ of gate signal $b_3$ is assumed to be longer than those of gate signals $T_1$, $T_2$. Then, a binary signal indicative of a time difference $|T_1-T_2|$ is produced from the up-down counters 171 to 173 and also produced from the up-down counters $183a$, $183b$. At the same time, a binary signal indicative of the period of time $T_2$ of gate signal $b_2$ is produced from up counters $182a$ to $182c$.

When the latch signal $d_3$ from timing signal generator 130 is applied to D-flip flop $143c$ of control signal generator 140, D-flip flop $143c$ acts to produce a high level signal under generation of the high level signal k from D-flip flop $143b$ so that the operation signal m of low level from RS-flip flop 144 rises to a high level (see FIG. 5). In the speed-difference calculation circuit 170, the binary signal from up-down counters 171 to 173 is latched by the latch circuits 176, 177 in response to the latch signal $d_3$ and applied to the correction signal generator 190 as a binary signal v indicative of the time difference $|T_1-T_2|$, and simultaneously the low level signal from D-flip flop 175 is produced and applied by D-flip flop 178 to the correction signal generator 190 as a sign signal $v_1$ with a low level or a positive sign. In the acceleration calculation circuit 180, the binary signal from up-down counters $183a$, $183b$ is latched by the latch circuits $186a$, $186b$ in response to the latch signal $d_3$ and applied to the correction signal generator 190 as a binary signal w indicative of the time difference $|T_1-T_2|$, and simultaneously the low level signal from D-flip flop 185 is inverted by D-flip flop 187 and applied to the correction signal generator 190 and distribution circuit 200 as a sign signal $w_1$ with a high level or a positive sign.

When the preset signal $e_3$ from timing signal generator 130 is applied to the correction signal generator 190, the down counters 192 and 194 preset respectively therein the binary signals w and v under control of inverter 191. Then, the counter 192 starts to count down a value of binary signal w in accordance with a series of the clock signals $C_3$ from AND-gate 193 and produces a high level signal at its carry-out terminal CO. Upon receiving the high level signal from down counter 192, AND-gate 197 acts to produce a high level signal under control of the exclusive OR-gate 196 caused by the sign signals $v_1$, $w_1$ respectively with low and high levels. This inhibits counting down operation of counter 194 and produces a high level signal from the carry-out terminal CO of counter 194. When AND-gate 198 produces a high level signal in response to the high level signal from counter 194 under generation of the operation signal m with high level from control signal generator 140, AND-gate 1901 produces a second correction signal $z_2$ with a high level through OR-gate 1903 under function of the exclusive OR-gate 196 responsive to the sign signals $v_1$, $w_1$ respectively with low and high levels. In addition, NOR-gate 1902 acts to produce a first correction signal $z_1$ of a low level due to the above-noted function of exclusive OR-gate 196.

When the distribution circuit 200 receives the correction signals $z_1$ and $z_2$ respectively with low and high levels from correction signal generator 190, it acts to produce a third distribution signal of a high level in relation to the high level of sign signal $w_1$ so that the transistors $TR_8$, $TR_9$ and $TR_{10}$ of drive circuit 220 are made conductive to produce a third drive signal from the transistor $TR_9$, as previously described. Thus, rotation of reversible motor 20 is conducted in response to the third drive signal from drive circuit 220 to further decrease the actual throttle opening angle under operation of rack-and-pinion 22. This further restrains the rate of increase of acceleration of the vehicle.

Upon completion of the counting down operation, the down counter 192 produces a low level signal at its carry-out terminal CO so that AND-gate 197 permits counting down operation of counter 194. Then, the counter 194 starts to count down a value of binary signal v in accordance with a series of the second clock signals $C_2$ from AND-gate 195 and continuously produces the high level signal at its carry-out terminal CO. Thus, the correction signal $z_2$ from OR-gate 1903 is maintained in high level under control of the exclusive OR-gate 199 responsive to the low and high level signals from down counter 192 and AND-gate 198. Upon completion of the counting down operation, the counter 194 acts to produce a low level signal at its carry-out terminal CO so that the second correction signal $z_2$ of high level from OR-gate 1903 drops to a low level under each control of AND-gate 198 and exclusive OR-gate 199. Then, the third distribution signal with high level from distribution circuit 200 drops to a low level in response to the correction signal $z_2$ of low level from OR-gate 1903 to make the transistors $TR_8$, $TR_9$ and $TR_{10}$ of drive circuit 220 nonconductive. Thus, the rotation of reversible motor 20 is stopped due to the nonconductive of transistors $TR_8$, $TR_9$ and $TR_{10}$ such that operation of rack-and-pinion 22 is halted to cease the decrease of the throttle opening angle.

From the above description, it will be understood that under generation of the operation signal m with low level after the actuation of set switch 40, the throttle opening angle is decreased due to a width of the correction signal $z_2$ defined by the value of binary signal w and that the rate of increase of the actual vehicle speed is effectively restrained to control the vehicle speed toward the command value.

When loads against the vehicle increase under this condition, the actual speed of the vehicle starts to decrease. Then, the decreasing vehicle speed is detected by the speed sensor 30 as a series of electric signals, each of which is reshaped by the wave shaper 120 and applied to the timing signal generator 130 as a rectangular pulse signal a. When the timing signal generator 130 produces a gate signal $b_m$ with a period of time $T_m$ and also produces latch and preset signals $d_m$, $e_m$ and reset signals $f_m$, $g_m$, as previously described, the up-down counters 171 to 173 of speed-difference calculation circuit 170 are responsive to the preset signal $e_m$ to preset therein the binary signal u from command-speed set circuit 160. Then, the counters 171 to 173 start to count down the value of binary signal u at the trailing edge of gate signal $b_m$ in accordance with a series of the first clock signals $C_1$ under generation of a low level signal from D-flip flop 175. In addition, the period of time $T_m$ of gate signal $b_m$ is longer than the period of time $T_1$ of gate signal $b_1$. The period of time $T_m$ is assumed to be longer than a period of time $T_{m-1}$ of a gate signal $b_{m-1}$ which was issued from the timing signal generator 130 prior to the gate signal $b_m$.

Upon receiving the preset signal $e_m$ from timing signal generator 130, the up-down counters 183a to 183c of acceleration calculation circuit 180 preset therein a binary signal indicative of the period of time $T_{m-1}$ which was previously counted in the up counters 182a to 182c. Then, the up-down counters 183a to 183c start to count down the period of time $T_{m-1}$ of the same binary signal at the trailing edge of gate signal $b_m$ in accordance with a series of the first clock signals $C_1$ under generation of a low level signal from D-flip flop 185. When each of the up-down counters 173 and 183c produces a low level signal at its carry-out terminal CO upon completion of each counting down operation in counters 171 to 173 and 183a to 183c, D-flip flop 175 of calculation circuit 170 produces a high level signal under control of NOR-gate 174 responsive to the low level signal from counter 173. D-flip flop 185 of calculation circuit 180 also produces a high level signal under control of NOR-gate 184 responsive to the low level signal from counter 183c. When the up-down counters 171 to 173 and 183a to 183c receive the high level signals from D-flip flops 175, 185 respectively, each of them acts to count up each of the remaining first clock signals $C_1$ defined by the period of time $T_m$ of gate signal $b_m$. At this stage, the high level signals from D-flip flops 175 and 185 are also applied to D-flip flops 178 and 187 respectively.

When the timing signal generator 130 produces a gate signal $b_{m+1}$ with a period of time $b_{m+1}$ and also produces latch and preset signals $d_{m+1}$, $e_{m+1}$ and reset signals $f_{m+1}$, $g_{m+1}$, as previously described, each counting up operation of counters 171 to 173 and 183a to 183c is completed at the leading edge of gate signal $b_{m+1}$. Then, a binary signal indicative of a time difference $|T_1-T_m|$ is produced from the counters 171 to 173 and applied to the latch circuits 176, 177, the time difference $|T_1-T_m|$ corresponding to the actual speed difference of the vehicle. Simultaneously, a binary signal indicative of a time difference $|T_{m-1}-T_m|$ is produced from the counters 183a, 183b and applied to the latch circuits 186a, 186b, the time difference $|T_{m-1}-T_m|$ corresponding to the actual acceleration of the vehicle. Subsequently, the binary signal from counters 171 to 173 is latched and applied by the latch circuits 176, 177 to the correction signal generator 190 as a binary signal v in response to the latch signal $d_{m+1}$, and simultaneously the high level signal from D-flip flop 175 is produced and applied by D-flip flop 178 to the correction signal generator 190 as a sign signal $v_1$ with a high level or a negative sign. The binary signal from counters 183a, 183b is also latched and applied by the latch circuits 186a, 186b to the correction signal generator 190 as a binary signal w in response to the latch signal $d_{m+1}$, and simultaneously the high level signal from D-flip flop 185 is inverted by D-flip flop 187 and applied to the correction signal generator 190 and distribution circuit 200 as a sign signal $w_1$ with a low level or a negative sign.

When the preset signal $e_{m+1}$ from timing signal generator 130 is applied to the correction signal generator 190, the down counters 192 and 194 preset respectively therein the binary signals w and v under control of inverter 191. Then, the counter 192 starts to count down a value of the binary signal w in accordance with a series of the third clock signals $C_3$ from AND-gate 193 so as to produce a high level signal at its carry-out terminal CO. At this stage, AND-gate 197 receives the high level signal from counter 192 to produce a high level signal under control of the exclusive OR-gate 196 responsive to the sign signals $v_1$ and $w_1$ respectively with high and low levels from calculation circuits 170, 180. Then, counting down operation of counter 194 is inhibited due to the high level signal from AND-gate 197 to produce a high level signal from the carry-out terminal CO of counter 194. When AND-gate 198 receives the high level signal from counter 194, it produces a high level signal under generation of the operation signal m with high level so that AND-gate 1901 produces a second correction signal $z_2$ with a high level through OR-gate 1903 under function of the exclusive OR-gate 196 responsive to the sign signals $v_1$ and $w_1$ respectively with high and low levels. In addition, a first correction signal $z_1$ from NOR-gate 1902 remains at a low level due to the above-noted function of the exclusive OR-gate 196.

When the distribution circuit 200 receives the correction signals $z_1$ and $z_2$ respectively with low and high levels from correction signal generator 190, it produces a second distribution signal of a high level in relation to the low level of sign signal $w_1$ so that the transistors $TR_5$, $TR_6$ and $TR_7$ of drive circuit 220 are made conductive to produce a second drive signal from the transistor $TR_6$, as previously described. Thus, the reversible motor 20 is rotated upon receiving the second drive signal from drive circuit 220 and operates the rack-and-pinion 22 to increase the actual throttle opening angle. As a result, acceleration of the vehicle is increased due to the increase of the throttle opening angle to control the actual vehicle speed toward the desired value.

Upon completing the counting down operation, the down counter 192 produces a low level signal at its carry-out terminal CO so that AND-gate 197 permits counting down operation of counter 194. Then, the counter 194 starts to count down a value of binary signal v in accordance with a series of the second clock signals $C_2$ from AND-gate 195 and continuously produces the high level signal at its carry-out terminal CO. Thus, the second correction signal $z_2$ from OR-gate 1903 is maintained in high level under control of the exclusive OR-gate 199 responsive to the low and high level signals from down counter 192 and AND-gate 198. Upon completion of the counting down operation, the counter 194 acts to produce a low level signal at its carry-out terminal CO so that the second correction signal $z_2$ of high level from OR-gate 1903 drops to a low level under each control of AND-gate 198 and exclusive OR-gate 199. Then, the second distribution signal with high level from distribution circuit 200 drops to a low level in response to the correction signal $z_2$ of low level from OR-gate 1903 to make the transistors $TR_5$, $TR_6$ and $TR_7$ of drive circuit 220 nonconductive. Thus, the rotation of reversible motor 20 is stopped due to the nonconduction of transistors $TR_5$, $TR_6$ and $TR_7$ such that the operation of rack-and-pinion 22 is halted to cease the increase of the throttle opening angle.

From the above description, it will be understood that under generation of the operation signal m of high level, the opening angle of throttle valve 12 is increased due to a width of the correction signal $z_2$ defined by the sum of each value of binary signals v and w and that the rate of decrease of the actual vehicle speed is effectively restrained to control the vehicle toward the command speed.

Assuming that at this stage the timing signal generator 130 produces a gate signal $b_M$ with a period of time $T_M$ and also produces latch and preset signals $d_M$, $e_M$ and reset signals $f_M$, $g_M$, as previously described, the up-down counters 171 to 173 of speed-difference calculation circuit 170 are responsive to the preset signal $e_M$ to preset therein the binary signal u from command-speed set circuit 160. Then, the counters 171 to 173 start to count down the value of binary signal u at the trailing edge of gate signal $b_M$ in accordance with a series of the first clock signals $C_1$ under generation of a low level signal from D-flip flop 175. In addition, the period of time $T_M$ of gate signal $b_M$ is still longer than the period of time $T_1$ of gate signal $b_1$ due to the vehicle loads but is shorter than a period of time $T_{M-1}$ of a gate signal $b_{M-1}$ which was issued from timing signal generator 130 prior to the gate signal $b_M$.

Upon receiving the preset signal $e_M$ from timing signal generator 130, the up-down counters 183a to 183c of acceleration calculation circuit 180 preset therein a binary signal indicative of the period of time $T_{M-1}$ which was previously counted in the up counters 182a to 182c. Then, the up-down counters 183a to 183c start to count down the period of time $T_{M-1}$ of the same binary signal at the trailing edge of gate signal $b_M$ in accordance with a series of the first clock signals $C_1$ under generation of a low level signal from D-flip flop 185. Upon completion of the counting down operation, the counters 183a, 183b produce a binary signal indicative of a time difference $|T_{M-1}-T_M|$ or the remaining value of the period of time $T_{M-1}$, the time difference $|T_{M-1}-T_M|$ corresponding to controlled acceleration of the vehicle. When the counter 173 produces a low level signal at its carry-out terminal CO upon completion of each counting down operation in counters 171 to 173, D-flip flop 175 produces a high level signal, as previously described. Upon receiving the high level signal from D-flip flop 175, the up-down counters 171 to 173 start to count up the remaining first clock signals $C_1$ first defined by the period of time $T_M$ of gate signal $b_M$.

When the timing signal generator 130 produces a gate signal $b_{M+1}$ with a period of time $T_{M+1}$ and also produces latch and preset signals $d_{M+1}$, $e_{M+1}$ and reset signals $f_{M+1}$, $g_{M+1}$, as previously described, each counting up operation of counters 171 to 173 is completed at the leading edge of gate signal $b_{M+1}$. Then, a binary signal indicative of a time difference $|T_1-T_M|$ is produced from the counters 171 to 173 and applied to the latch circuits 176, 177, the time difference $|T_1-T_M|$ corresponding to controlled speed difference of the vehicle. Subsequently, the binary signal from counters 171 to 173 is latched and applied by the latch circuits 176, 177 to the correction signal generator 190 as a binary signal v in response to the latch signal $d_{M+1}$, and simultaneously the high level signal from D-flip flop 175 is produced and applied by D-flip flop 178 to the correciton signal generator 190 as a sign signal $v_1$ with a high level or a negative sign. The binary signal from counters 183a, 183b is also latched and applied by the latch circuits 186a, 186b to the correction signal generator 190 as a binary signal w in response to the latch signal $d_{M+1}$, and simultaneously the low level signal from D-flip flop 185 is inverted by D-flip flop 187 and applied as a sign signal $w_1$ with a high level or a positive sign to the correction signal generator 190 and distribution circuit 200.

When the down counters 192 and 194 of correction signal generator 190 receive the preset signal $e_{M+1}$ from timing signal generator 130, they preset respectively therein the binary signals w and v under control of inverter 191. Then, the counter 192 starts to count down a value of the binary signal w in accordance with a series of the third clock signals $C_3$ and produces a high level signal at its carry-out terminal CO. When AND-gate 197 receives the high level signal from down counter 192 under function of the exclusive OR-gate 196 responsive to the sign signals $v_1$, $w_1$ respectively with high level, it acts to produce a low level signal in such a manner as to permit counting down operation of counter 194. Then, the down counter 194 starts to count down a value of the binary signal v in accordance with a series of the second clock signals $C_2$ and produces a high level signal at its carry-out terminal CO. This means that the counting down operation of down counter 194 is started simultaneously with that of the down counter 192. When NOR-gate 1902 receives the high level signal from down counter 192, it acts to produce a first correction signal $z_1$ of a low level. When the high level signals from down counters 192 and 194 are applied to the exclusive OR-gate 199 and AND-gate 198 respectively, AND-gate 198 produces a high level signal under generation of the operation signal m with high level to produce a low level signal from the exclusive OR-gate 199. Meanwhile, AND-gate 1901 is controlled by the exclusive OR-gate 196 in response to the sign signals $v_1$, $w_1$ respectively with high level to produce a low level signal. Thus, each of the low level signals from exclusive OR-gate 199 and AND-gate 1901 is produced from OR-gate 1903 as a second correction signal $z_2$ with a low level.

If the time difference $|T_{M-1}-T_M|$ of binary signal w is larger than the time difference $|T_1-T_M|$ of binary signal v, counting down operation of counter 194 is completed prior to that of counter 192. Upon completing the counting down operation, the counter 194 produces a low level signal to produce a low level signal from AND-gate 198. Then, the second correction signal $z_2$ from OR-gate 1903 rises to a high level under control of the exclusive OR-gate 199 responsive to the low level signal from AND-gate 198. When the distribution circuit 200 receives the correction signals $z_1$ and $z_2$ respectively with low and high levels from correction signal generator 190, it cooperates with the transistors $TR_8$, $TR_9$ and $TR_{10}$ of drive circuit 200 in relation to the high level of sign signal $w_1$ so that the reversible motor 20 is rotated to operate the rack-and-pinion 22 so as to decrease the actual throttle opening angle.

Upon completing the counting down operation, the down counter 192 produces a low level signal at its carry-out terminal CO, and the correction signal $z_2$ of high level drops to a low level under control of the exclusive OR-gate 199 responsive to the low level signal from counter 192. Thus, the distribution circuit 200 cooperates with the transistors $TR_8$, $TR_9$ and $TR_{10}$ in response to the correction signal $z_2$ of low level so that the rotation of reversible motor 20 is stopped to cease the decrease of the throttle opening angle.

If the time difference $|T_{M-1}-T_M|$ of binary signal w is smaller than the time difference $|T_1-T_M|$ of binary signal v, counting down operation of counter 192 is completed prior to that of counter 194. Upon completing the counting down operation, the counter 192 produces a low level signal to make the first correction signal $z_1$ from NOR-gate 1902 a high level signal. The exclusive OR-gate 199 also produces a high level signal in response to the low level signal from counter 192 to make the second correction signal $z_2$ from OR-gate 1903 a high level signal. When the distribution circuit 200 receives the correction signals $z_1$ and $z_2$ respectively with high level from correction signal generator 190, it cooperates with the transistors $TR_5$, $TR_6$ and $TR_7$ of drive circuit 220 in relation to the high level of sign signal $w_1$ so that the reversible motor 20 is rotated to increase the actual throttle opening angle.

Upon completion of the counting down operation, the down counter 194 produces a low level signal at its carry-out terminal CO, and the correction signal $z_2$ of high level drops to a low level under each control of the exclusive OR-gate 199 and AND-gate 198 responsive to the low level signal from counter 194. Thus, the distribution circuit 200 cooperates with the transistors $TR_5$, $TR_6$ and $TR_7$ in response to the correction signal $z_2$ of low level so that the rotation of reversible motor 20 is stopped to cease the increase of the throttle opening angle.

From the above description, it will be understood that under generation of the operation signal m of high level, the throttle opening angle is also decreased or increased due to a width of the correction signal $z_2$ defined by a difference between each value of binary signals v and w, thereby to effectively control the actual vehicle speed toward the command value.

Although in the above operation, decrease of the vehicle speed caused by increase of the vehicle loads is controlled by the speed control system of the present invention, it will be clearly understood that increase of the vehicle speed caused by decrease of the vehicle loads will be also effectively controlled by the speed control system in the substantially same as the above-mentioned operation.

In case an operator of the vehicle wishes to increase the command speed up to a higher value, the acceleration switch 60 is manually closed to produce an electric signal which is reshaped by the wave shaper 146a of control signal generator 140 and is then inverted by the inverter 146 into an acceleration signal n (see FIG. 4). When the acceleration signal n from inverter 146 is applied to the distribution circuit 200, it passes through OR-gate 204a and AND-gate 208a as a second distribution signal to make the transistors $TR_5$, $TR_6$ and $TR_7$ of drive circuit 220 conductive. Thus, the reversible motor 20 is rotated due to the conduction of transistors $TR_5$, $TR_6$ and $TR_7$ to increase the actual throttle opening angle, as previously described. When the vehicle speed reaches the higher desired value, the acceleration switch 60 is released to cease generation of the acceleration signal n from control signal generator 140, and the control signal generator 140 acts to produce a command-speed set signal $j_2$ in the same as generation of the above-noted command-speed set signal $j_1$. Thereafter, the throttle actuator AC is controlled by the electronic control circuit EC, as previously described, to maintain the actual vehicle speed in the higher desired value.

When the cancel switch 50 is manually closed to produce a release signal h, the first transistor circuit 220a of drive circuit 220 is deactivated, and simultaneously the operation signal r with low level from RS-flip flop 1405 of control signal generator 140 rises to a high level to deactivate the second and third transistor circuits 220b, 220c of drive circuit 220 under control of distribution circuit 200, as previously described. This acts to deenergize the clutch mechanism 21 and reversible motor 20, and activation of the first transistor circuit 220a is again conducted upon disappearance of the release signal h from cancel switch 50. When the operation signal r of high level from RS-flip flop 1405 again drops to a low level upon closure of the resume switch 70, the distribution circuit 200 is permitted to activate the second and third transistor circuits 220b, 220c to control the throttle actuator AC, as previously described. In case the actual vehicle speed exceeds the maximum value controllable by the speed control system, a release signal $s_2$ is produced from the cancellation circuit 150 to deactivate the drive circuit 220 in the same operation as that of the cancel switch 50.

For practice of the present invention, the throttle actuator AC may be replaced with an electromagnetically operated vacuum mechanism in which a throttle opening angle is controlled by cooperation of a servomotor and solenoid valves in response to engine intake manifold vacuum and output signals from the control circuit EC. In this case, the control circuit EC may be replaced with another electronic circuit which includes a digital computer with a predetermined program to control the throttle opening angle.

Although in the above embodiment the speed sensor 30 having the reed switch 32 is adapted as means for detecting a vehicle speed, it may be replaced with a sensor in the form of an AC generator or a photo-coupler having a photo transistor and a light emission diode. Furthermore, the command-speed set circuit 160 may be replaced with an electronic circuit in which a binary signal indicative of a period of time corresponding to a desired vehicle speed is produced by manipulation of a digital code switch independently of the clock circuit 110, timing signal generator 130 and control signal generator 140.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A speed control system for an automotive vehicle driven by an internal combustion engine under control of a throttle valve, the control system comprising:

first means for repetitively producing a timing signal with a period of time responsive to change of the actual speed of the vehicle;

second means arranged to be activated when the actual speed of the vehicle reaches a desired value, said second means producing a set signal upon activation thereof;

third means responsive to the set signal for producing an operation signal upon receiving the timing signal and for ceasing generation of the operation signal in response to one of the subsequent timing signals from said first means;

fourth means for producing a command signal indicative of a predetermined period of time defined by the desired speed of the vehicle;

fifth means responsive to the timing signal for calculating a first time difference between the predetermined period of time and the actual period of time of the timing signal and for producing a first differential signal indicative of a first absolute value of the calculated first time difference and a first sign signal indicative of the positive or negative sign of the calculated first time difference;

sixth means responsive to the timing signal for calculating a second time difference between the respective actual periods of time of the preceding and following timing signals and for producing a second differential signal indicative of a second absolute value of the calculated second time difference and a second sign signal indicative of the positive or negative sign of the calculated second time difference;

seventh means responsive to the timing and second differential signals during generation of the operation signal for producing a first correction signal indicative of the second absolute value, said seventh means being responsive to the timing signal and the first and second differential signals after disappearance of the operation signal for calculating the sum of the first and second absolute values when respective signs of the first and second sign signals are identical to each other and for calculating a difference between the first and second absolute values when respective signs of the first and second sign signals are opposite to each other, said seventh means selectively producing second and third correction signals respectively indicative of the calculated sum and the calculated difference;

eighth means responsive to one of the first, second and third correction signals for selectively producing first and second output signals in relation to the positive or negative sign of the second sign signal; and actuator means for increasing and decreasing the opening angle of said throttle valve respectively in response to the first and second output signals.

2. A speed control system as claimed in claim 1, wherein said third means includes a first logic circuit responsive to the set signal for producing an output signal; and a second logic circuit responsive to the timing signal from said first means for producing an operation signal upon receiving the output signal from said first logic circuit, said second logic circuit ceasing to produce the operation signal in response to one of the subsequent timing signals from said first means.

3. A speed control system as claimed in claim 1 or 2, further comprising a clock circuit for producing a series of clock signals at a constant frequency in sequence; and wherein said seventh means includes:

a first down counter circuit responsive to the timing signal for counting down the number of the clock signals defined by the second differential signal to produce a high level signal during its counting down operation and to produce a low level signal upon completion of its counting down operation;

a logic element for producing a high level signal when respective signs of the first and second sign signals are identical to each other and for producing a low level signal when respective signs of the first and second sign signals are opposite to each other;

a second down counter circuit responsive to the high level signals from said first down counter circuit and said logic element for producing a first high level signal and responsive to the low level signal from said first down counter circuit for counting down the number of the clock signals defined by the first differential signal to maintain the first high level signal during its counting down operation, said second down counter circuit being responsive to the timing signal and to the high and low level signals from said first down counter circuit and said logic element for counting down the number of the clock signals defined by the first differential signal to produce a second high level signal during its counting down operation and to produce a low level signal upon completion of its counting down operation; and a logic circuit for producing a first correction signal indicative of a width of the high level signal from said first down counter circuit during generation of the operation signal, said logic circuit producing a second correction signal indicative of a width of the first high level signal from said second down counter circuit in relation to the high level signal from said logic element after disappearance of the operation signal and producing a third correction signal indicative of a width of one of the low level signals from said first and second down counter circuits in relation to the low level signal from said logic element after disappearance of the operation signal.

4. A speed control system as claimed in claim 2, wherein said third means further includes a third logic circuit responsive to the timing signal from said first means for producing a second operation signal upon receiving the output signal from said first logic circuit; and wherein said eighth means is arranged to further produce a third output signal in response to the second operation signal from said third logic circuit; and wherein said actuator means includes an electrical reversible motor to be rotated in one direction upon receiving the first output signal and to be rotated in the other direction upon receiving the second output signal, an electromagnetic clutch mechanism coupled to said reversible motor and being responsive to the third output signal to be energized for engagement thereof, means responsive to energization of said clutch mechanism for controlling the opening angle of said throttle valve in accordance with rotation of said reversible motor.

* * * * *